(12) United States Patent
Miyagi et al.

(10) Patent No.: US 11,863,719 B2
(45) Date of Patent: Jan. 2, 2024

(54) IMAGE READING APPARATUS

(71) Applicant: SEIKO EPSON CORPORATION, Tokyo (JP)

(72) Inventors: Yohei Miyagi, Okinawa (JP); Yuhei Hamada, Kitakyushu (JP); Keita Fuji, Nakama (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/935,597

(22) Filed: Sep. 27, 2022

(65) Prior Publication Data
US 2023/0094383 A1 Mar. 30, 2023

(30) Foreign Application Priority Data
Sep. 30, 2021 (JP) ................................. 2021-160473

(51) Int. Cl.
*H04N 1/00* (2006.01)
(52) U.S. Cl.
CPC ..... *H04N 1/00578* (2013.01); *H04N 1/00602* (2013.01)
(58) Field of Classification Search
CPC ...... H04N 1/04; H04N 1/00602; H04N 1/193; H04N 1/03; H04N 1/1017; H04N 1/00795; H04N 1/00909; H04N 1/12; H04N 2201/02402; H04N 2201/02404; H04N 2201/0442; B65H 29/125; B65H 5/062; B65H 5/26; B65H 7/00; B65H 2405/332; B65H 2511/414; B65H 2515/32; B65H 2515/70; B65H 2555/24; B65H 3/44; G03G 9/08; G03G 9/0825; G03G 9/087; G03G 9/0872; G03G 9/097; G03G 15/00

USPC .................................................. 358/474, 498
See application file for complete search history.

(56) References Cited

U.S. PATENT DOCUMENTS

| | | | | |
|---|---|---|---|---|
| 8,699,092 B2* | 4/2014 | Yamasaki | .......... | H04N 1/02865 347/245 |
| 2001/0026380 A1* | 10/2001 | Imoto | ................ | H04N 1/00795 358/496 |
| 2005/0194731 A1* | 9/2005 | Ohama | .................. | B65H 5/062 271/10.11 |
| 2007/0201113 A1* | 8/2007 | Nishikawa | .......... | H04N 1/00909 358/506 |
| 2012/0019878 A1* | 1/2012 | Motoyama | ......... | H04N 1/00615 358/474 |
| 2012/0133994 A1* | 5/2012 | Yamasaki | .......... | H04N 1/02855 362/311.01 |

(Continued)

FOREIGN PATENT DOCUMENTS

JP 2012-246098 A 12/2012

*Primary Examiner* — Negussie Worku
(74) *Attorney, Agent, or Firm* — WORKMAN NYDEGGER

(57) ABSTRACT

A scanner includes a reading unit, a reversing unit, a discharge unit, a mounting portion, and a pressing portion. The discharge unit discharges a document that is reversed by the reversing unit. On the mounting portion, the document discharged by the discharge unit is mounted. The pressing portion presses the document toward the mounting portion. The pressing portion has a moving member that is provided and configured to move toward the mounting portion, and an elastic member that applies an elastic force to the moving member so that the moving member comes into contact with the document on the mounting portion.

16 Claims, 20 Drawing Sheets

(56) References Cited

U.S. PATENT DOCUMENTS

| | | | |
|---|---|---|---|
| 2013/0107334 A1* | 5/2013 | Miura | H04N 1/2032 |
| | | | 358/498 |
| 2017/0107072 A1* | 4/2017 | Nakamura | B65H 29/14 |
| 2019/0306352 A1* | 10/2019 | Miwa | B65H 31/02 |
| 2021/0400155 A1* | 12/2021 | Fukushima | H04N 1/00567 |
| 2023/0234801 A1* | 7/2023 | Hamada | H04N 1/00591 |
| | | | 271/298 |
| 2023/0247155 A1* | 8/2023 | Hamada | B65H 29/125 |
| | | | 271/278 |

* cited by examiner

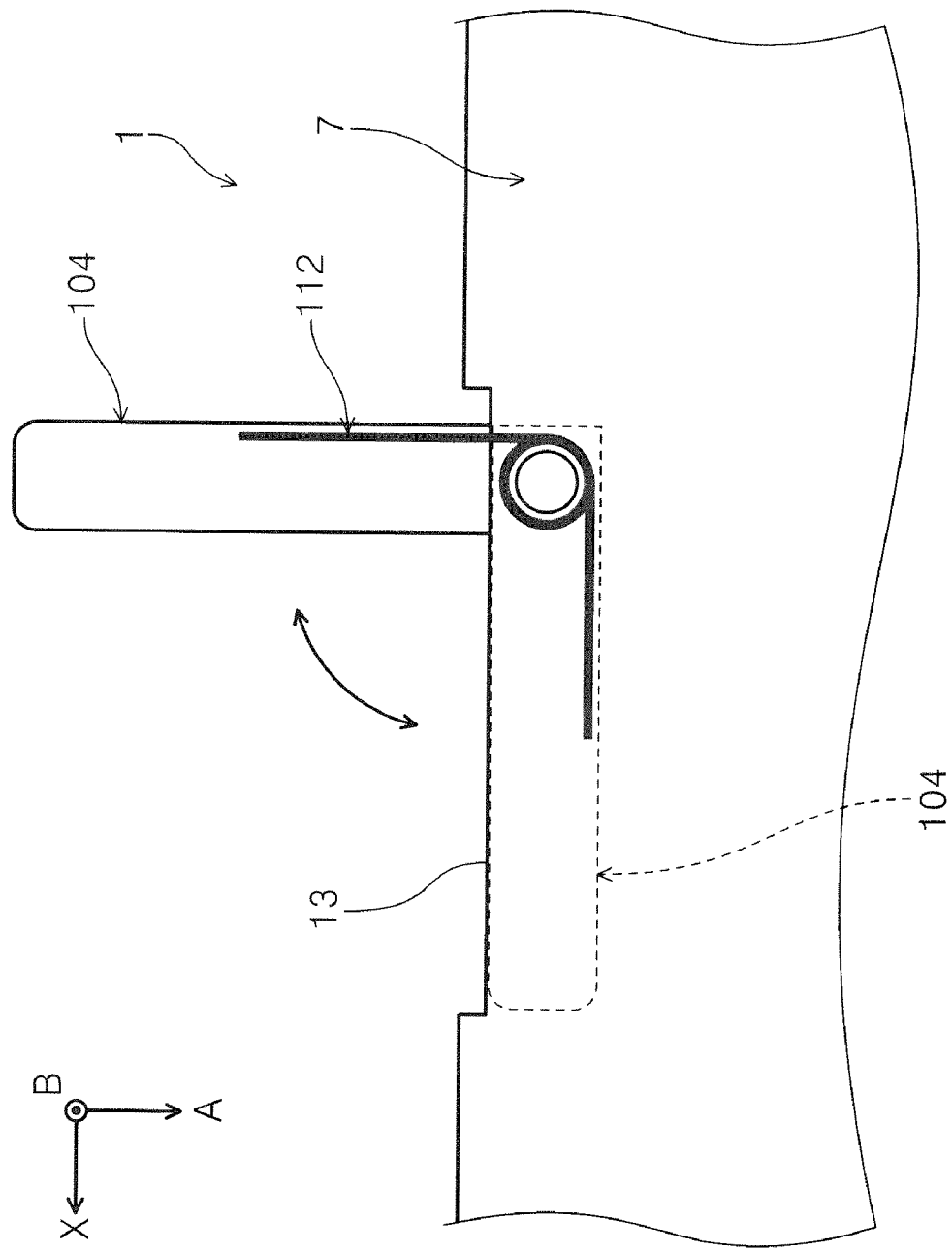

IMAGE READING APPARATUS

The present application is based on, and claims priority from JP Application Serial Number 2021-160473, filed Sep. 30, 2021, the disclosure of which is hereby incorporated by reference herein in its entirety.

BACKGROUND

1. Technical Field

The present disclosure relates to an image reading apparatus.

2. Related Art

The image reading apparatus of JP-A-2012-246098 includes a U-shaped transportation path along which a sheet is transported toward a paper discharge tray and a sheet pressing member that presses down a sheet stacked on the paper discharge tray. The sheet pressing member is extended substantially in a tangential direction from a tip of a curved cover.

In a configuration such as the configuration of JP-A-2012-246098, a sheet pressing member is extended substantially in a tangential direction from a tip of a curved cover. Therefore, when a certain number of documents is not stacked on a mounting portion, the documents are buckled due to an insufficient force to press the documents, and stacking performance of the documents in the mounding unit is reduced.

SUMMARY

The present disclosure is an image reading apparatus including a reading unit that reads a document, a reversing unit that reverses front and rear of the document read by the reading unit, a discharge unit that discharges the document reversed in the reversing unit in a discharging direction, a mounting portion on which the document discharged by the discharge unit is mounted, and a pressing portion that presses the document toward the mounting portion, in which the pressing portion has a moving member that is provided and configured to move toward the mounting portion, and an elastic member that applies an elastic force to the moving member to cause the moving member to come into contact with the document on the mounting portion.

BRIEF DESCRIPTION OF THE DRAWINGS

FIG. 20 is a schematic view illustrating a state in which the moving member of the modification stands erect by a returning force of a torsion spring.

DESCRIPTION OF EXEMPLARY EMBODIMENTS

Figure 1:
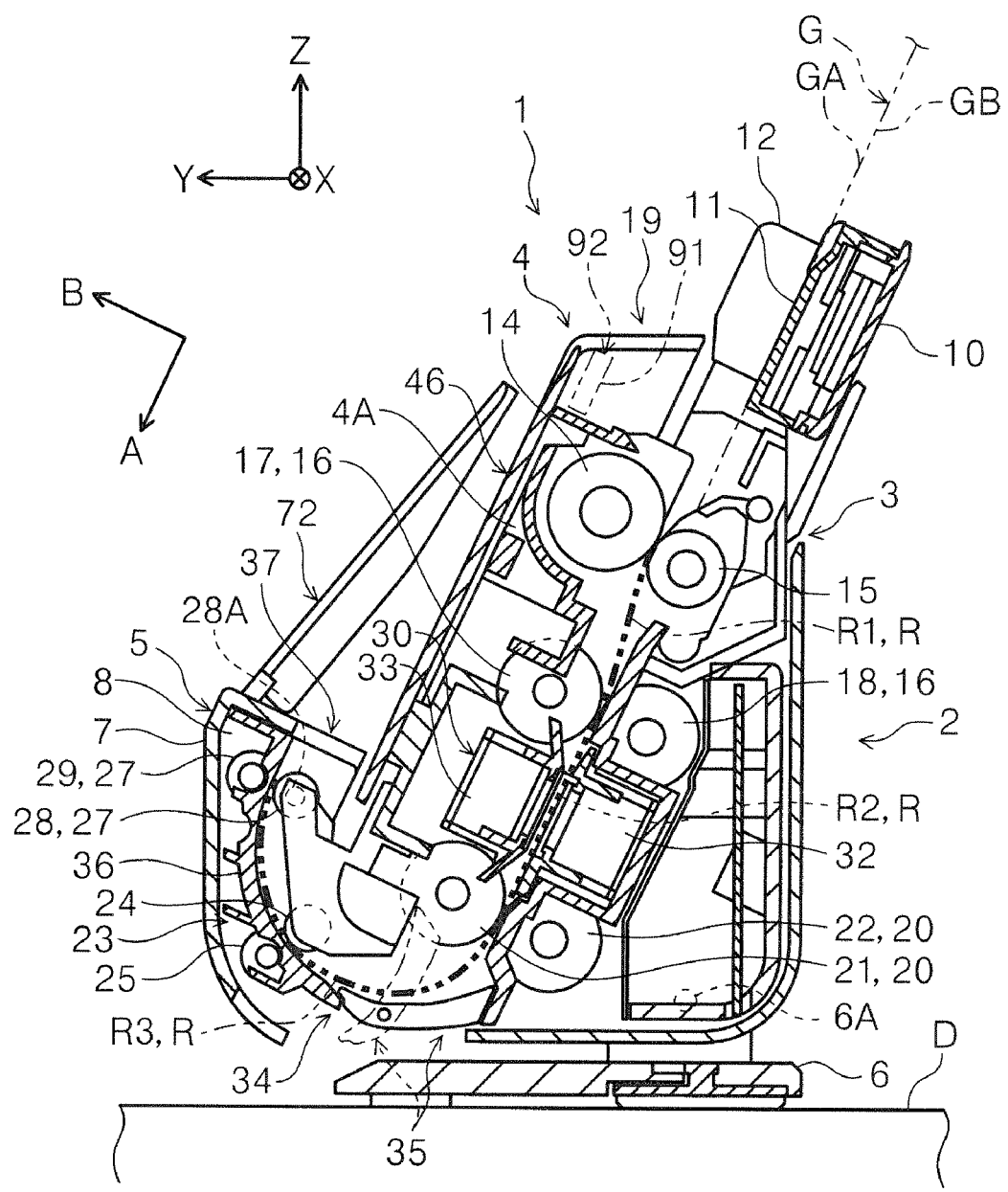
FIG. 1 is a sectional view of a scanner in which an apparatus main body is in a normal reading posture when viewed from one side in a width direction.

Hereinafter, the present disclosure will be schematically described. An image reading apparatus according to the first aspect includes a reading unit that reads a document, a reversing unit that reverses front and rear of the document read by the reading unit, a discharge unit that discharges the document reversed in the reversing unit in a discharging direction, a mounting portion on which the document discharged by the discharge unit is mounted, and a pressing portion that presses the document toward the mounting portion, and the pressing portion has a moving member that is provided and configured to move toward the mounting portion, and an elastic member that applies an elastic force to the moving member to cause the moving member to come into contact with the document on the mounting portion.

The front and rear of the read document are reversed by the reversing unit. After the reversed document is discharged by the discharge unit, the reversed document is mounted on the mounting portion. The dead weight of the document acts on the document mounted on the mounting portion. Therefore, a part of the document is deformed in a direction separating from the mounting portion, that is, a part of the document may be buckled. According to this aspect, the moving member to which the elastic force is applied by the elastic member moves toward the mounting portion and comes into contact with the document so as to press the document against the mounting portion. As a result, since the elastic force acts on the document as a reaction force to the dead weight of the document, the document can be suppressed from being buckled. Moreover, since the document is suppressed from being buckled, a discharge space of the document that will be discharged next is suppressed from being closed by the document that has been already discharged, as a result of which the stacking performance of a plurality of the documents can be suppressed from being reduced.

According to the second aspect, in the image reading apparatus in the first aspect, the moving member is disposed and overlaps with a center in a width direction intersecting with the discharging direction of the document, when viewed in a stacking direction of the document on the mounting portion. According to this aspect, compared to a configuration in which the moving member presses an end portion in the width direction of the document, the document can be evenly suppressed from being buckled in the width direction.

According to the third aspect, in the image reading apparatus in the first or the second aspect, the discharge unit includes a rotation shaft that extends in a width direction intersecting with the discharging direction, and a plurality of contact portions that is provided in the rotation shaft at an interval in the width direction and comes into contact with the document, and the moving member is located between the plurality of contact portions in the width direction when viewed in the discharging direction. According to this aspect, the same effects as the effects of the first or the second aspect can be obtained.

According to the fourth aspect, in the image reading apparatus in the third aspect, on an outer side of the contact portions in the width direction, a displacement member that displaces the document discharged from the discharge unit toward the mounting portion is provided. According to this aspect, since the displacement member displaces the document toward the mounting portion, an upstream end in the discharging direction of the document can be suppressed from remaining in the discharge unit.

According to the fifth aspect, in the image reading apparatus in any one of the first to the fourth aspects, a first interval between a downstream end in the discharging direction of the moving member and the mounting portion is smaller than a second interval between an upstream end in the discharging direction of the moving member and the mounting portion. In the document discharged from the discharge unit, a downstream portion in the discharging direction is likely to be deformed by the dead weight compared to an upstream portion. According to this aspect, since the downstream portion of the document that is likely to be deformed easily comes into contact with the moving member compared to the upstream portion, the document can be suppressed from being deformed due to its dead weight.

According to the sixth aspect, in the image reading apparatus in the fifth aspect, the moving member has a first surface facing a mounting surface of the mounting portion, and a second surface located upstream in the discharging direction with respect to the first surface, and when an angle formed by a virtual plane obtained by moving the mounting surface in parallel and the first surface is a first angle $\theta 1$, and an angle formed by the virtual plane and the second surface is a second angle $\theta 2$, the first angle $\theta 1$ is smaller than the second angle $\theta 2$. According to this aspect, since the first angle $\theta 1$ is smaller than the second angle $\theta 2$, the first surface located downstream in the discharging direction is closer to the mounting surface than the second surface located upstream. As a result, compared to a configuration in which the first angle $\theta 1$ is equal to or larger than the second angle $\theta 2$, since a contact area of a portion of the document that is likely to be deformed and the moving member can be increased, the document can be suppressed from being deformed due to its dead weight. Moreover, since the interval between the second surface and the mounting surface is larger than the interval between the first surface and the mounting surface, at an early stage of discharging the document, the moving member is unlikely to come into contact with the document. As a result, at the early stage of discharging of the document in the discharge unit, a load imposed on the document can be reduced.

According to the seventh aspect, in the image reading apparatus in any one of the first to the sixth aspects, a cover portion that faces an upstream end portion in the discharging direction of the mounting portion is provided, the cover portion has a storage portion that is configured to store the moving member, the moving member is provided and configured to be rotated to a storage position when being stored in the storage portion and to a facing position when being configured to come into contact with the document. According to this aspect, the moving member is located at the storage position by being rotated from the facing position. That is, the moving member is stored in the storage portion. As a result, when the document mounted on the mounting portion is taken out, the document can be suppressed from being caught in the moving member.

According to the eighth aspect, the image reading apparatus in any one of the first to the seventh aspects further includes an apparatus main body including the mounting portion, and the apparatus main body is provided with a supporting member that is located downstream in the discharging direction of the mounting portion and configured to support the document. According to this aspect, even when the document has a size sticking out from the mounting portion in the discharging direction, since the supporting member supports the portion of the document sticking out from the mounting portion, the document can be suppressed from being deformed.

According to the ninth aspect, in the image reading apparatus in the eighth aspect, when viewed in a stacking direction of the document on the mounting portion, at least a part of the moving member and at least a part of the supporting member are aligned in the discharging direction. According to this aspect, an upstream portion in the discharging direction of the document is pressed toward the mounting portion by the moving member. Moreover, a downstream portion in the discharging direction of the document is supported by the supporting member. Here, the upstream portion of the document that comes into contact with the moving member and the downstream portion of the document that comes into contact with the supporting member are aligned in the discharging direction. As a result, compared to a configuration in which the moving member and the supporting member are located while being out of alignment in a width direction intersecting with the discharging direction, the document can be suppressed from being deformed.

According to the tenth aspect, in the image reading apparatus in the eighth or the ninth aspect, the apparatus main body has a supporting member storage portion that is configured to store the supporting member, and the supporting member is provided and configured to be rotated to a first position when being stored in the supporting member storage portion and to a second position when being configured to support the document. According to this aspect, the supporting member is stored in the supporting member storage portion by being rotated from the second position to the first position. As a result, when the image reading apparatus is not used, the size of the image reading apparatus can be reduced.

According to the 11th aspect, in the image reading apparatus in any one of the eighth to the tenth aspects, the supporting member is not located on a side of the moving member with respect to a virtual line obtained by extending the mounting surface of the mounting portion to a side of the supporting member. According to this aspect, since the supporting member does not project on the moving member side with respect to the virtual line, when the document that is being discharged moves along the mounting surface, the document can be suppressed from being caught in the supporting member.

According to the 12th aspect, in the image reading apparatus in any one of the eighth to the 11th aspects, a second inclination angle θB formed by the supporting member and a horizontal direction is smaller than a first inclination angle θA formed by the moving member and the horizontal direction. According to this aspect, the same effect as the effect of any one of the eighth to the 11th aspects can be obtained.

According to the 13th aspect, in the image reading apparatus in any one of the first to the 12th aspects, the discharge unit has a first discharge roller that is configured to rotate, and a second discharge roller that discharges the document by rotating while pinching the document together with the first discharge roller, the apparatus main body has a first main body portion that supports the first discharge roller, and a second main body portion that supports the second discharge roller, and the second main body portion is provided and configured to move relatively to the first main body portion to cause the second discharge roller to be configured to come into contact with and be separated from the first discharge roller. According to this aspect, as the second main body portion is moved with respect to the first main body portion, the second discharge roller is separated from the first discharge roller. As a result, since the discharge unit is released, the document for which discharging has been interrupted is easily removed.

According to the 14th aspect, in the image reading apparatus in any one of the first to the 13th aspects, an operation unit that is configured to operate a reading operation of the document by the reading unit is provided, and the operation unit is located outside a moving region of the moving member when viewed in a stacking direction of the document on the mounting portion. According to this aspect, since the operation unit is located outside the moving region of the moving member, the moving state of the moving member is easily confirmed.

According to the 15th aspect, in the image reading apparatus in the 14th aspect, the operation unit overlaps with at least a part of the moving region of the moving member when viewed in a width direction intersecting with the discharging direction. According to this aspect, since the operation unit overlaps with at least a part of the moving region when viewed in the width direction, the size of the image reading apparatus can be reduced.

According to the 16th aspect, in the image reading apparatus in any one of the first to the 13th aspects, an operation unit that is configured to operate a reading operation of the document by the reading unit is provided, and the operation unit overlaps with at least a part of a moving region of the moving member when viewed in a width direction intersecting with the discharging direction. According to this aspect, since the operation unit overlaps with at least a part of the moving region when viewed in the width direction, the size of the image reading apparatus can be reduced.

According to the 17th aspect, in the image reading apparatus in any one of the 14th to the 16th aspects, the operation unit has a touch panel and a notification unit that performs notification by outputting sound, and at least a part of the notification unit is located between the touch panel and the mounting portion. According to this aspect, since, when viewed from an operation side of the touch panel, at least a part of the notification unit is hidden on the mounting portion side with respect to the touch panel, the size of the operation unit can be reduced in a width direction intersecting with the discharging direction.

Figure 2:
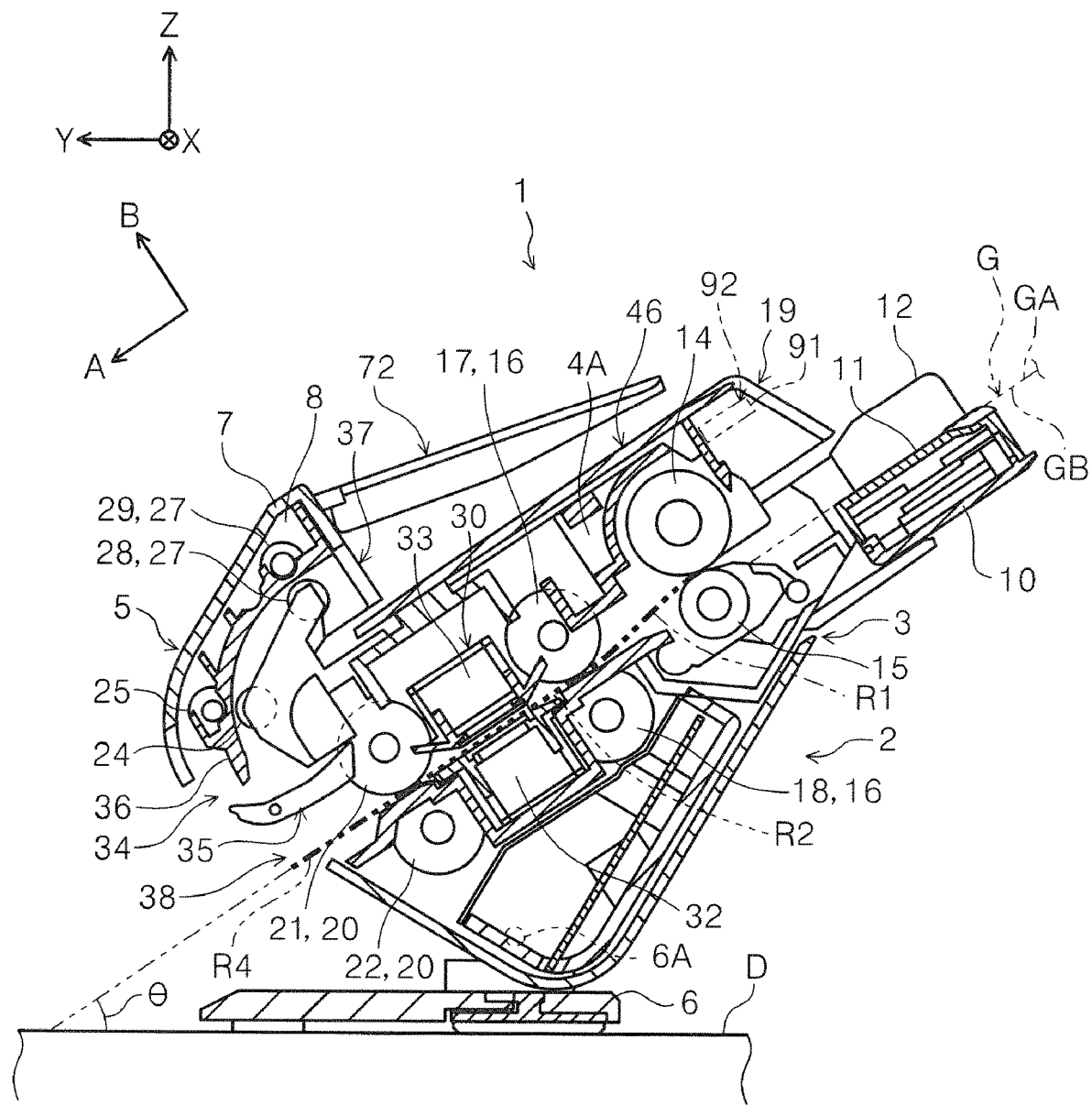
FIG. 2 is a sectional view of the scanner in which the apparatus main body is in a booklet reading posture when viewed from the one side in the width direction.

Hereinafter, the present disclosure will be described in detail. As illustrated in FIGS. 1 and 2, as an example of an image reading apparatus, a scanner 1 that is configured to read at least one surface of a front surface GA of a document G and a back surface GB opposite thereto will be described. The scanner 1 is so-called a sheet feed type scanner that performs reading while moving the document G with respect to a reading unit 30 described later. In the specification, examples of the document G include not only a sheet but also a card-like or booklet-like document.

Note that in the X-Y-Z coordinate system indicated in each figure, an X-axis direction is a width direction of the apparatus and a width direction of the document G. A Y-axis direction is an apparatus depth direction, a Z-axis direction is a direction extending in the vertical direction. In the present embodiment, a +Y direction is a direction from the apparatus back surface to the front surface, and a −Y direction is a direction from the apparatus front surface to the back surface. In addition, when viewed from the apparatus front surface, the left direction is a +X direction, and the right direction is a −X direction. In addition, the upward direction of the Z-axis direction is a +Z direction, and the downward direction is a −Z direction.

Hereinafter, a direction in which a transportation path R of the document G extends in a position facing the reading unit 30 described later is an A-axis direction. In the A-axis direction, a direction in which the document G is transported is a +A direction. That is, the +A direction is an example of a transporting direction. In addition, in the A-axis direction, in a normal reading posture described later, a direction in which the document G is discharged is a −A direction. That is, the −A direction is an example of a discharging direction. The A-axis direction is orthogonal to the X-axis direction. The +A direction is a direction toward the +Y direction and the −Z direction. A direction orthogonal to both of the A-axis direction and the X-axis direction is a B-axis direction. The B-axis direction is an example of a stacking direction of the document G on a mounting portion 46 described later. In the B-axis direction, a direction having an element of the +Z direction is a +B direction, and a direction having an element of the −Z direction is a −B direction.

Figure 5:
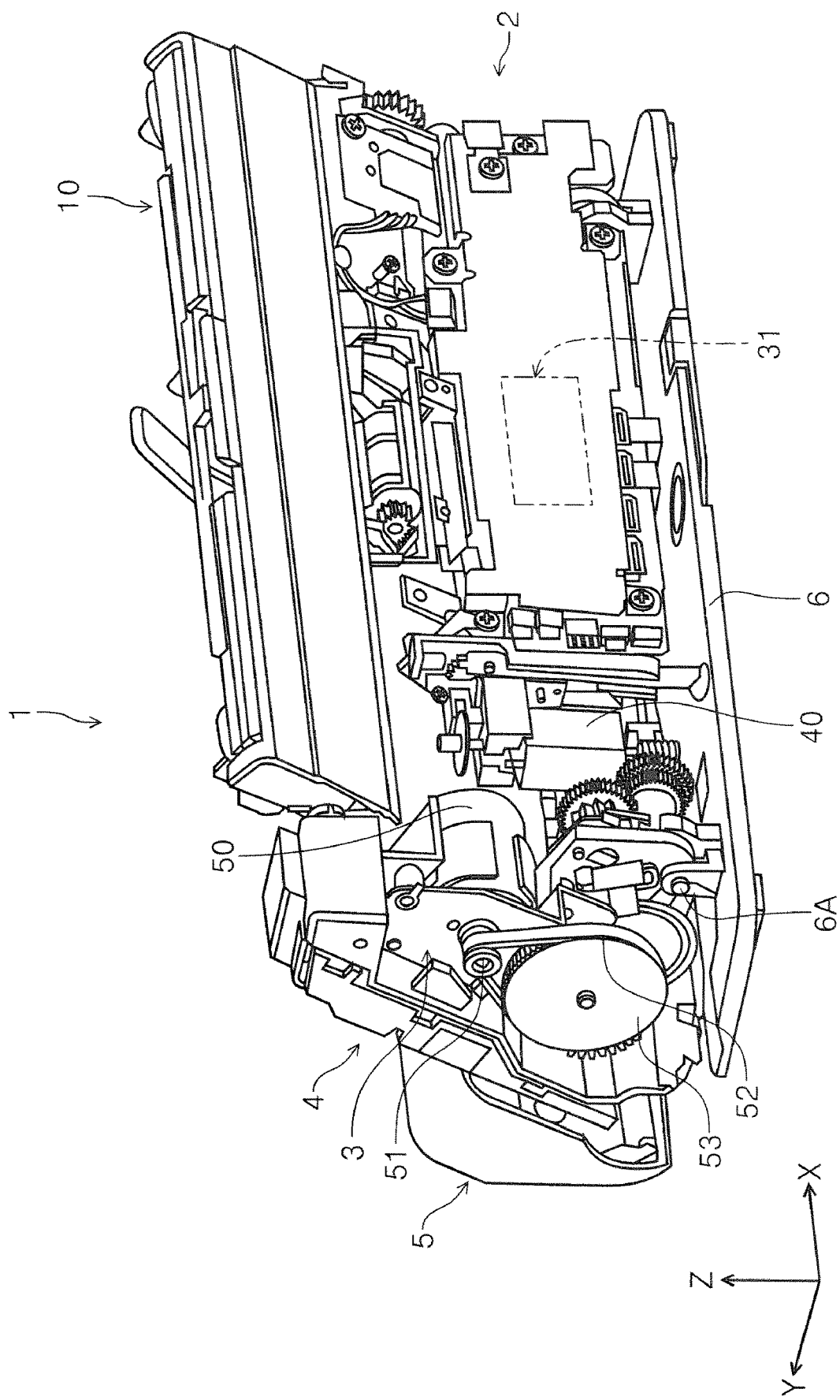
FIG. 5 is a view of the scanner, in which the apparatus main body is in the normal reading posture, when viewed from a diagonal rear side.

The scanner 1 has an apparatus main body 2 and a stand 6 that rotatably supports the apparatus main body 2. The apparatus main body 2 has a first unit 3, a second unit 4, and a third unit 5. In addition, in the apparatus main body 2, the transportation path R described later along which the document G is transported is formed. Specifically, the apparatus main body 2 includes the reading unit 30 described later, a reversing unit 34, a discharge unit 27, the mounting portion 46, and a pressing portion 72. In addition, the apparatus main body 2 is provided with a supporting member 92 described later. The first unit 3 is configured by including an upper opening/closing portion 10, a separation roller 15, a second roller 18, a fourth roller 22, a control unit 31 (FIG. 5), a posture switching motor 40, and a transportation motor 50 (FIG. 5).

The second unit 4 is located in the +Y direction with respect to the first unit 3. The second unit 4 is an example of a first main body portion that supports a first discharge roller 28 described later. The second unit 4 is configured by including a main body frame 4A and the mounting portion 46 described later. The end portion in the +Z direction of the main body frame 4A is provided with a supporting member storage portion 91. In other words, the apparatus main body 2 has the supporting member storage portion 91.

Figure 14:
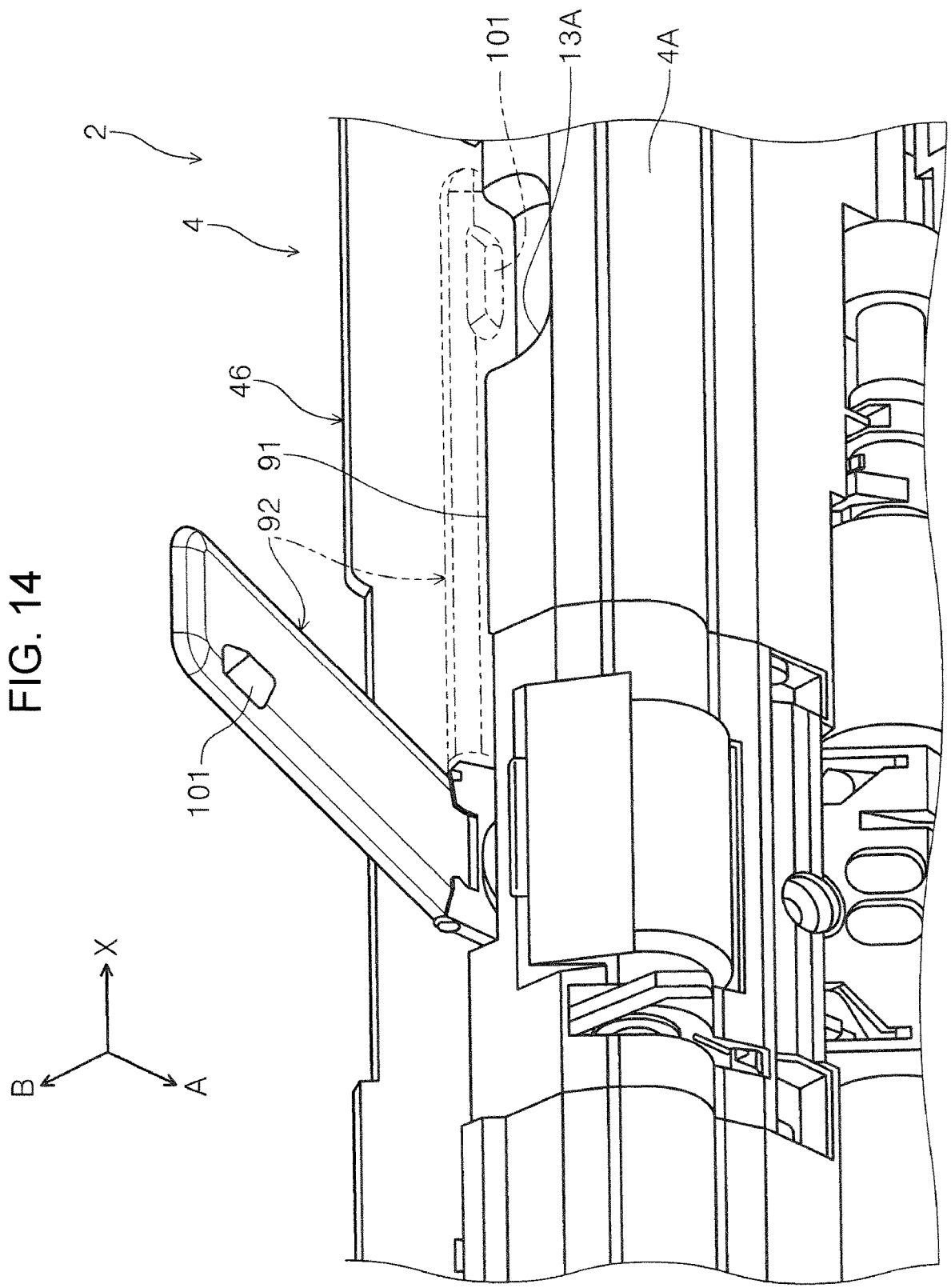
FIG. 14 is a perspective view of the supporting member in a used state when viewed from a diagonal rear side.

As illustrated in FIG. 14, the supporting member storage portion 91 is provided in a central portion in the X-axis direction at the end portion in the +Z direction of the main body frame 4A. In addition, the supporting member storage portion 91 is located in the −Y direction with respect to the mounting portion 46 described later. In other words, the supporting member storage portion 91 is hidden in the −Y direction with respect to the mounting portion 46. The supporting member storage portion 91 has a size capable of storing the supporting member 92 described later and is open in the −A direction. In an outer edge portion of the supporting member storage portion 91, a recessed portion 13A that causes a holding portion 101 to be holdable is formed.

Figure 6:
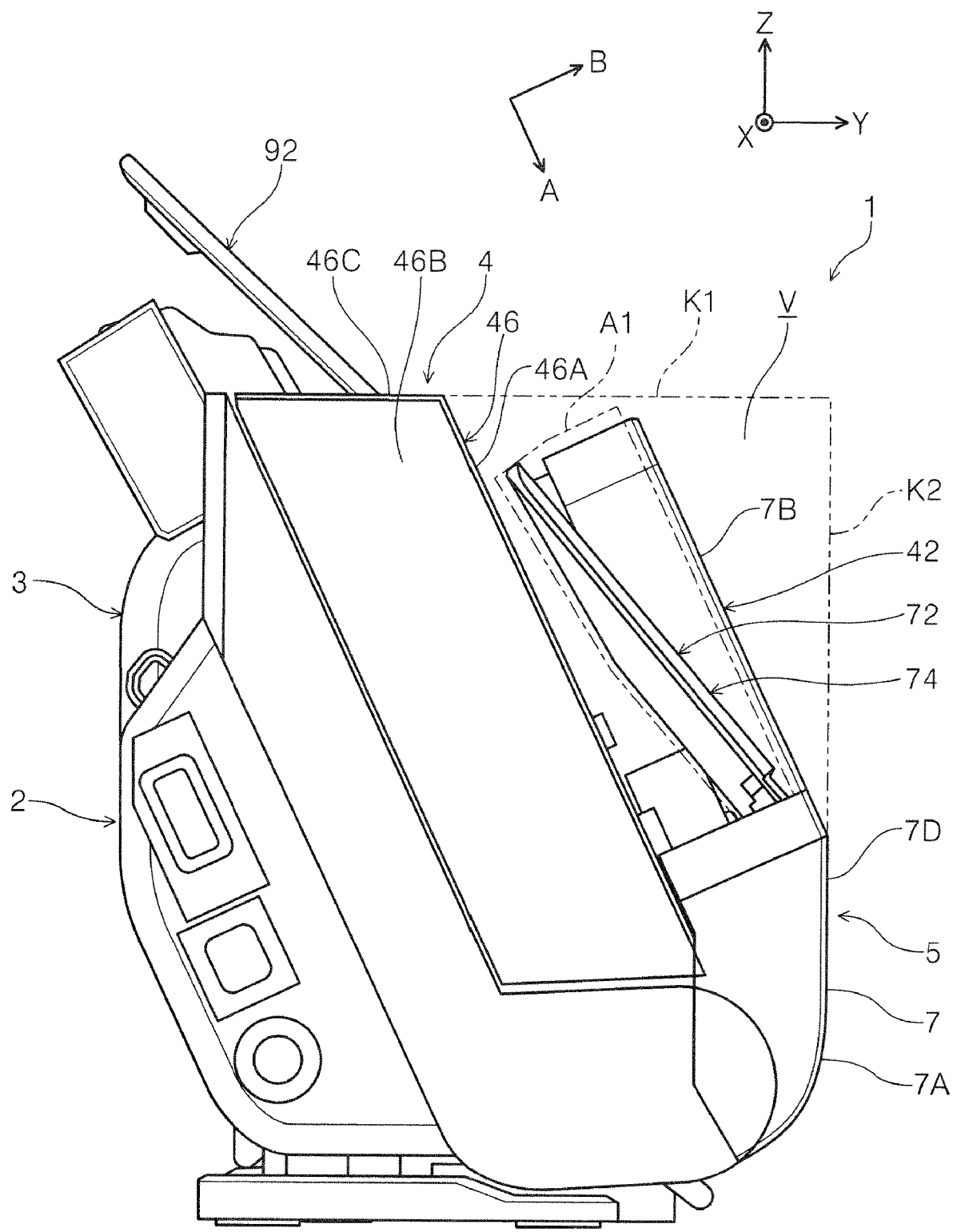
FIG. 6 is a side view illustrating an arrangement relation between a moving member and an operation unit when the scanner, in which the apparatus main body is in the normal reading posture, is viewed from another side in the width direction.

As illustrated in FIG. 6, the mounting portion 46 configures a side portion in the +Y direction of the second unit 4 in the normal reading posture described later. The mounting portion 46 is formed into a plate shape having a prescribed thickness in the B-axis direction. The mounting portion 46 is a portion where the document G discharged by the discharge unit 27 (FIG. 1) described later is mounted. A mounting surface 46A that is a part of the mounting portion 46 and on which the document G is mounted is, as an example, a plane along the X-A plane. In each end portion in the X-axis direction of the second unit 4, a side wall 46B constituting a part of the mounting portion 46 is provided. An upper end surface 46C in the +Z direction of the side wall 46B extends, as an example, along the X-Y plane. When viewed in the X-axis direction, a line obtained by extending the upper end surface 46C in the Y-axis direction is a virtual line K1.

As illustrated in FIG. 1, the third unit 5 is located in the +Y direction with respect to the second unit 4. The third unit 5 is an example of a second main body portion that supports a second discharge roller 29 described later. The third unit 5 is provided with an operation unit 42 (FIG. 3) described later. The operation unit 42 is configured so as to be capable of operating a reading operation of the document G by the reading unit 30.

Figure 4:
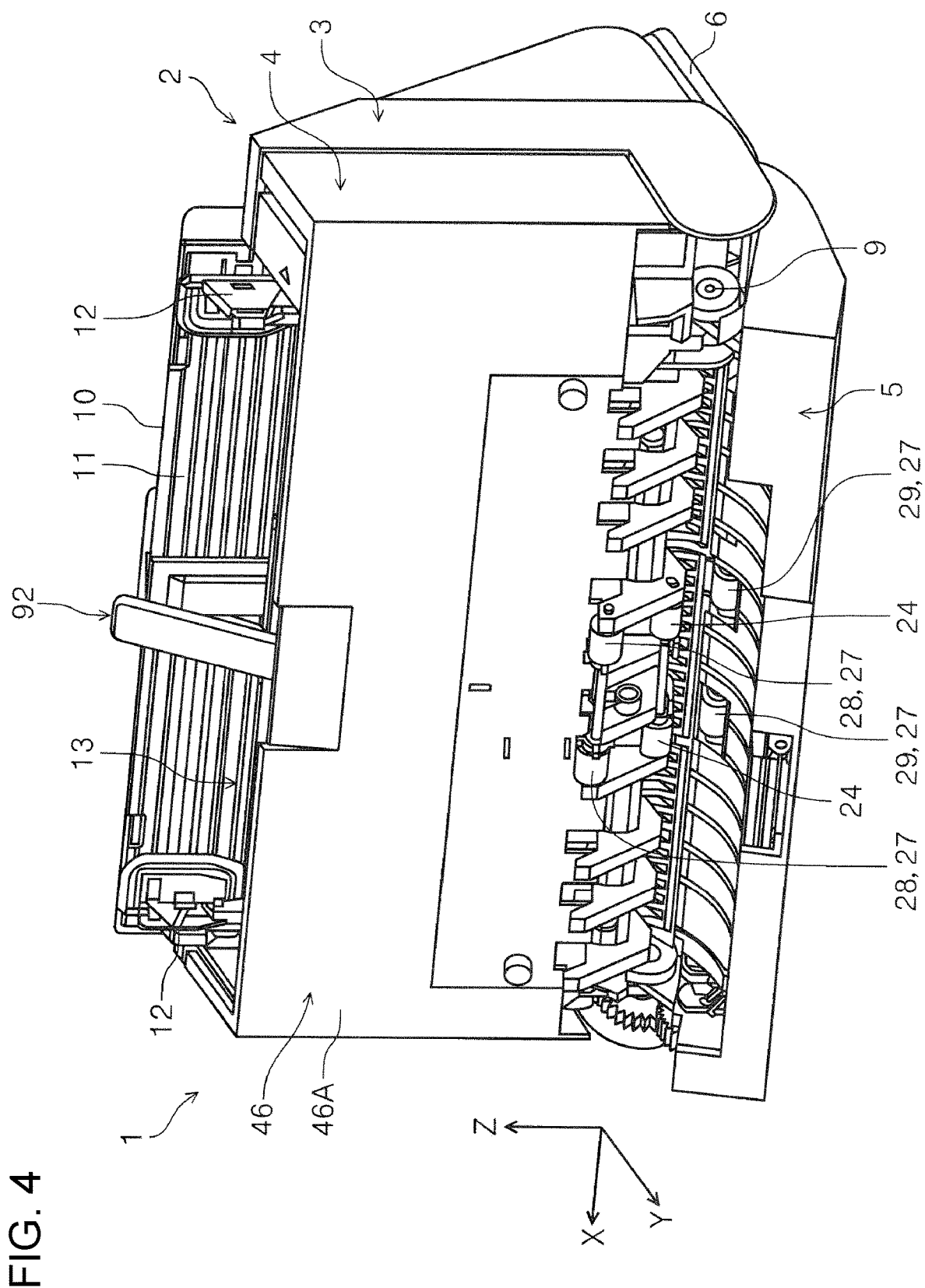
FIG. 4 is a perspective view illustrating a state in which a third unit is released with respect to a second unit.

The second unit 4 and the third unit 5 are provided so as to be rotatable around a frame rotation shaft 9 (FIG. 4). The frame rotation shaft 9 forms a rotation shaft center that is parallel to the X-axis direction. The second unit 4 and the third unit 5 are integrally rotatable around the frame rotation shaft 9 with respect to the first unit 3. By rotating the second unit 4 and the third unit 5 with respect to the first unit 3, a document feeding path R1 and a reading transportation path R2 described later are exposed.

As illustrated in FIG. 4, the third unit 5 can be rotated around the frame rotation shaft 9 with respect to the first unit 3 and the second unit 4. In other words, the third unit 5 is provided so as to move relatively to the second unit 4 so that contact and separation of the second discharge roller 29 with respect to the first discharge roller 28 described later becomes possible. In addition, by rotating the third unit 5 and the first unit 3 with respect to the second unit 4, a reverse transportation path R3 (FIG. 1) described later can be exposed.

As illustrated in FIGS. 1 and 2, the third unit 5 is, as an example, configured by including a cover member 7, a main body frame 8, a guide member 36, a lower roller 25, the second discharge roller 29, the operation unit 42 (FIG. 3), and the pressing portion 72. The main body frame 8 is a frame forming the base of the third unit 5 and supports each member constituting the third unit 5. Note that each configuration of the third unit 5 will be described later.

The apparatus main body 2 is rotatable around a main body rotation shaft 6A with respect to the stand 6. In the present embodiment, the apparatus main body 2 can be held in two postures by being rotated. The posture of the apparatus main body 2 illustrated in FIG. 1 is referred to as the normal reading posture. The posture of the apparatus main body 2 illustrated in FIG. 2 is referred to as a booklet reading posture. The posture of the apparatus main body 2 is switched as a gear that is engaged with a rack portion (not illustrated) of the stand 6 is rotated by the posture switching motor 40 (FIG. 5). Operation of the posture switching motor 40 is controlled by the control unit 31 (FIG. 5). Note that a surface on which the stand 6 is mounted is an installation surface D. The installation surface D is, as an example, a plane along the X-Y plane.

As illustrated in FIG. 2, an angle formed by the reading transportation path R2 described later and the installation surface D is a posture angle $\theta[°]$. The posture angle $\theta$ in the booklet reading posture is smaller than the posture angle $\theta$ in the normal reading posture. In the scanner 1 in the normal reading posture, the projected area of the apparatus main body 2 to the installation surface D is minimized. That is, in the normal reading posture, the footprint of the apparatus main body 2 is minimized. Note that the footprint in the specification corresponds to the area on the X-Y plane occupied by the apparatus main body 2 when the apparatus main body 2 is looked down from an upper part in the Z-axis direction.

Figure 3:
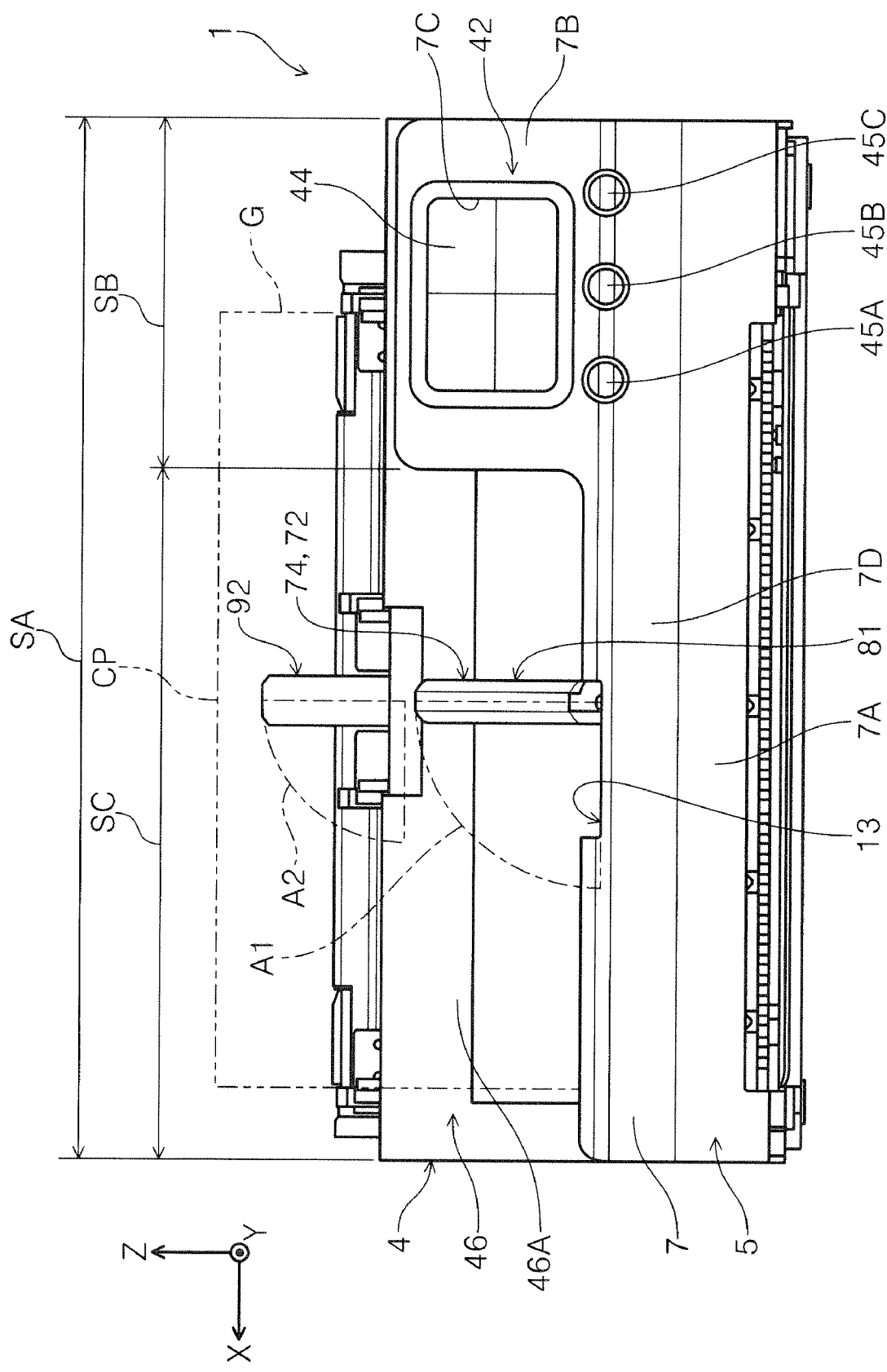
FIG. 3 is a front view of the scanner in which the apparatus main body is in the normal reading posture.

As illustrated in FIG. 3, the cover member 7 is an example of a cover portion facing an upstream end portion in the −A direction of the mounting portion 46. The cover member 7 has a first cover portion 7A extending in the X-axis direction, and a second cover portion 7B extending from the first cover portion 7A in the +Z direction, in the −X direction with respect to the center in the X-axis direction of the first cover portion 7A.

When viewed in the −Y direction, the first cover portion 7A covers the main body frame 8, the guide member 36, the lower roller 25, and the second discharge roller 29 (FIG. 1) from the +Y direction. In an end portion in the +Z direction of the first cover portion 7A, a first discharge port 37 (FIG. 1) is formed. In a portion that is an edge portion of the first discharge port 37 in the first cover portion 7A, in the central portion in the X-axis direction, a storage portion 13 (FIG. 9) is provided. A range SA is a range in the X-axis direction of the first cover portion 7A.

In the second cover portion 7B, a window portion 7C that exposes a touch panel 44 described later is formed. A range SB is a range in the X-axis direction of the second cover portion 7B. The range SB includes the operation unit 42 described later. A range SC is a range excluding the range SB from the range SA. In other words, the range SC does not overlap with the range SB. Inside the range SC, a moving member 74 and the supporting member 92 described later are located. Note that the first cover portion 7A is, as an example, configured by including a front surface 7D along the X-Z plane. When viewed in the X-axis direction, a line obtained by extending the front surface 7D in the Z-axis direction is a virtual line K2 (FIG. 6).

Figure 9:
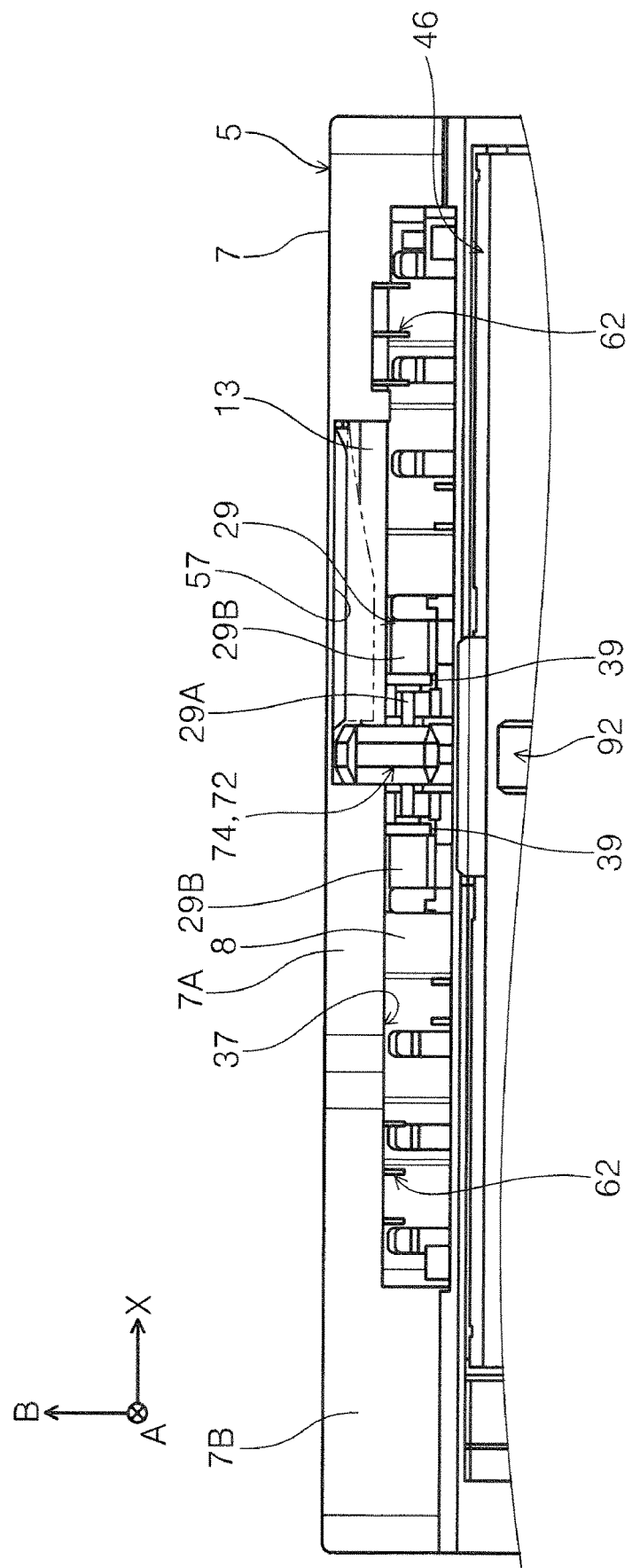
FIG. 9 is a plan view of a discharge unit of the third unit when viewed from above.

As illustrated in FIG. 9, in an end portion in the +A direction of the first cover portion 7A, an opening portion 57 is formed. The opening portion 57 is a portion cut away further in the +B direction from a portion constituting the first discharge port 37 in the first cover portion 7A. The opening portion 57 is opened in the −A direction. The opening portion 57 has a size that allows the moving member 74 described later to pass through the opening portion 57. In other words, the opening portion 57 functions as an entrance of the storage portion 13.

The cover member 7 has the storage portion 13 capable of storing the moving member 74. The storage portion 13 is configured with a part of the first cover portion 7A and a wall portion (not illustrated) provided in a portion in the −B direction of the first cover portion 7A. That is, the storage portion 13 forms a space portion in which the moving member 74 is stored. Note that a portion in which a support shaft 71 (FIG. 11) described later of the main body frame 8 is provided may be included in the storage portion 13.

As illustrated in FIG. 3, the moving member 74 is provided so as to be rotated to a storage position and a facing position. The storage position is a position when the moving member 74 is stored in the storage portion 13. The facing position is a position when the moving member 74 is capable of coming into contact with the document G. As an example, when viewed in the −Y direction from the front surface side, the position where the moving member 74 stands erect in the Z-axis direction is the facing position. Note that in the facing position, a first facing position is a position before a second rotation portion 81 described later is rotated toward the mounting portion 46 and is distinguished from a second facing position that is a position after the second rotation portion 81 is rotated toward the mounting portion 46.

The supporting member 92 is provided so as to be capable of being rotated to a first position and a second position. The first position is a position when the supporting member 92 is stored in the supporting member storage portion 91 (FIG. 14) described later. The second position is a position when the supporting member 92 is capable of supporting the document G. As an example, when viewed from the front surface side in the −Y direction, the position where the supporting member 92 stands erect in the Z-axis direction is the second position. Note that details of the moving member 74 and the supporting member 92 will be described later.

As illustrated in FIG. 3, when viewed in the B-axis direction, the moving member 74 and a part of the supporting member 92 are aligned in the −A direction. A moving region A1 that is a region in which the moving member 74 is rotated is, as an example, a circular arc region indicated by a dashed line A1 when viewed in the Y-axis direction. A moving region A2 that is a region in which the supporting member 92 is rotated is, as an example, a circular arc region indicated by a dashed line A2 when viewed in the Y-axis direction.

Figure 7:
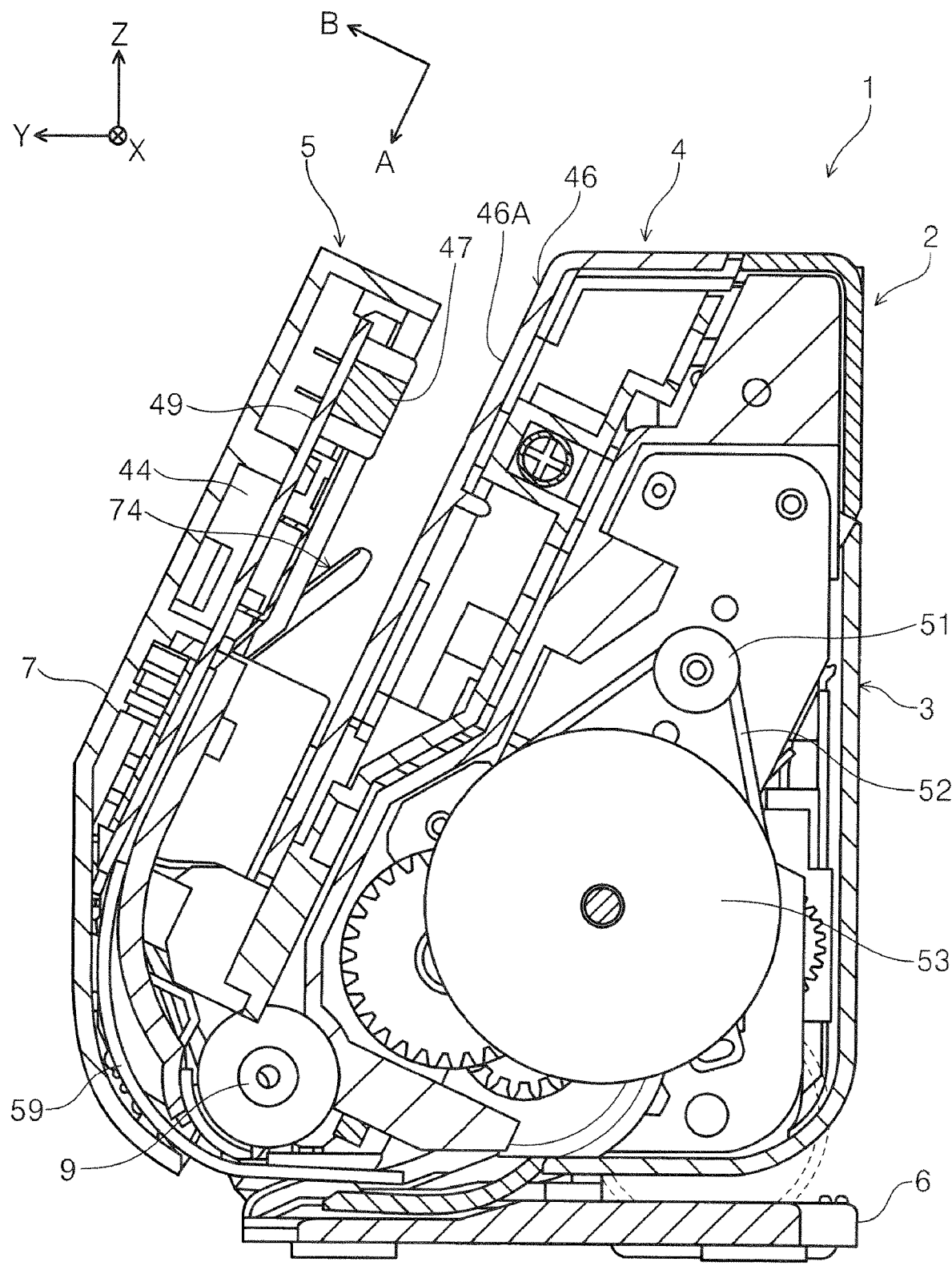
FIG. 7 is a sectional view of a portion including the operation unit of the scanner, in which the apparatus main body is in the normal reading posture, when viewed from the one side of the width direction.

The operation unit 42 has, as an example, the touch panel 44, and operation buttons 45A, 45B, and 45C. The operation unit 42 is capable of transmitting and receiving a signal with the control unit 31 (FIG. 5). The operation unit 42 is provided with a buzzer 47 (FIG. 7). The touch panel 44 can display and input information on the operation of the scanner 1. In the −B direction with respect to the touch panel 44, a substrate 49 (FIG. 7) in which transmission and reception of a signal is performed corresponding to the touch panel 44 and the like is provided. The operation buttons 45A, 45B, and 45C are provided on the first cover portion 7A and located in the −Z direction with respect to the touch panel 44. The operation buttons 45A, 45B, and 45C are assigned to serve as a power on and off switch of the scanner 1, and the like.

When viewed in the B-axis direction (FIG. 1), the operation unit 42 is located outside in the X-axis direction of the moving region A1. Specifically, the operation unit 42 is located away from the moving region A1 in the −X direction. In other words, the moving region A1 and the installation region of the operation unit 42 do not overlap with each other.

As illustrated in FIG. 6, the moving member 74 described later is rotatable toward the mounting portion 46. That is, the moving region A1 of the moving member 74 is a region having a width not only in the X-axis direction but also in the B-axis direction. Here, the operation unit 42 overlaps with a part of the moving region A1 when viewed in the X-axis direction intersecting with the −A direction. In addition, the operation unit 42 is located inside a space portion V surrounded by the virtual line K1, the virtual line K2, the cover member 7, and the mounting surface 46A. As a result, compared to a case where the operation unit 42 projects outside the space portion V, the size of the scanner 1 is reduced.

Figure 8:
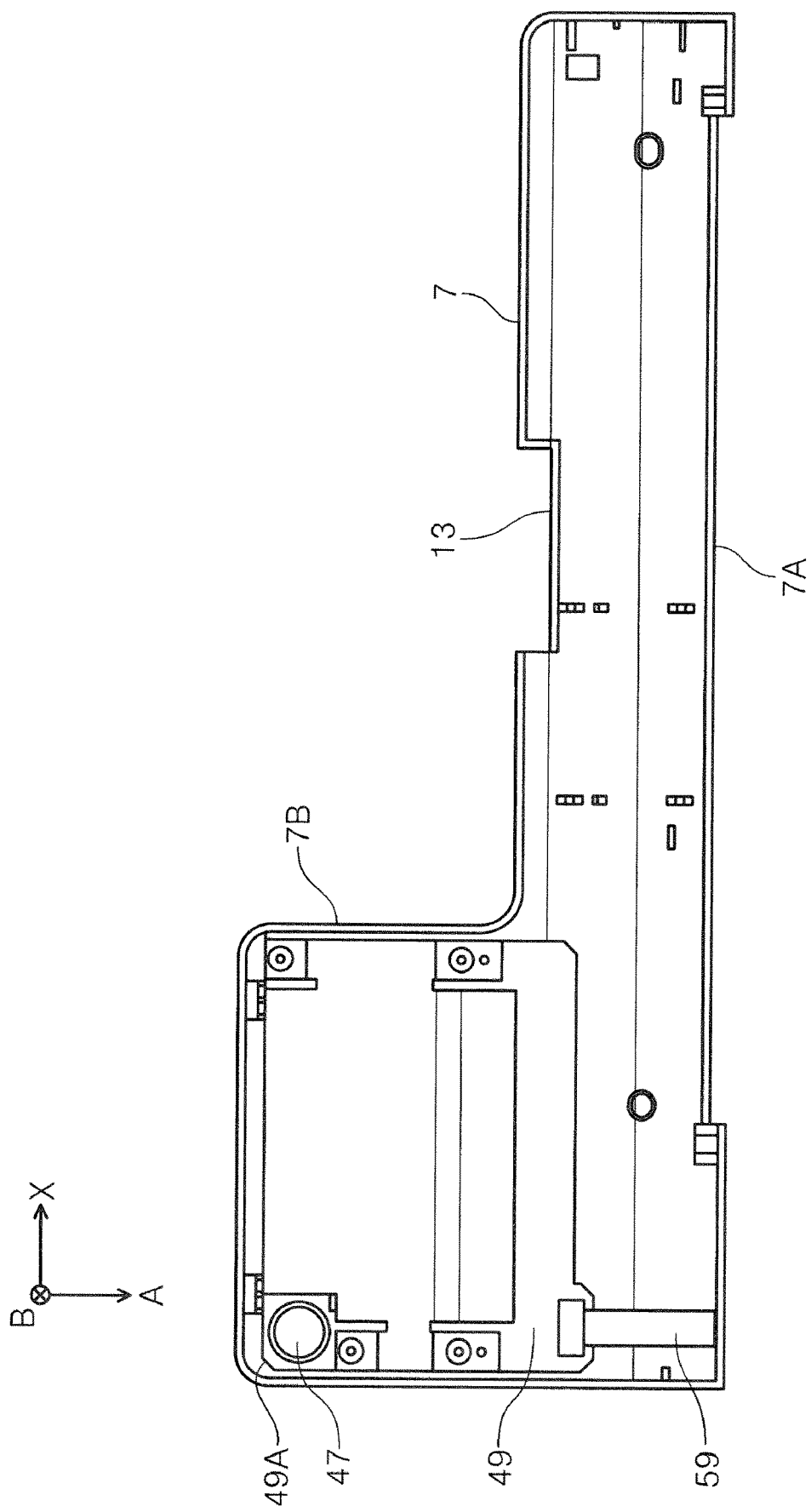
FIG. 8 is a rear view illustrating a back side of the third unit.

As illustrated in FIGS. 7 and 8, the buzzer 47 is an example of a notification unit that performs notification by outputting sound by a command form the control unit 31 (FIG. 5). Sound is output in the buzzer 47, for example, when completion of reading is notified or when a transportation error of the document G occurs. The buzzer 47 is provided on the substrate 49. The substrate 49 is coupled to the control unit 31 via wiring including a flexible flat cable (FFC) 59. In addition, the buzzer 47 projects in the −B direction from the substrate 49. In this manner, the buzzer 47 is located between the touch panel 44 and the mounting portion 46. Note that the buzzer 47 is provided in a corner portion 49A located in the −X direction and the −A direction with respect to the center in the substrate 49 so as not to come into contact with the document G.

Next, a configuration of the transportation path R of the document G in the scanner 1 will be described. As illustrated in FIGS. 1 and 2, the first unit 3 has the upper opening/closing portion 10 that functions as a lid of the transportation path R. The upper opening/closing portion 10 opens and closes a feeding port 19 by being rotated round a shaft (not illustrated). In the upper opening/closing portion 10, a document supporting portion 11 is formed. The document G to be fed is supported by the document supporting portion 11 in an inclined posture. When a plurality of the documents G is supported by the document supporting portion 11, the topmost document G is fed downstream in the +A direction by a feeding roller 14. The document supporting portion 11 is provided with edge guides 12 that guide both end portions in the X-axis direction of the document G. The edge guides 12 are disposed at an interval in the X-axis direction and provided so as to be slidable in the X-axis direction. In the scanner 1, each document G is, as an example, fed by a center feeding method.

The feeding roller 14 is provided in the second unit 4. Specifically, the feeding roller 14 is provided upstream in the +A direction from a pair of first transportation rollers 16 described later. The feeding roller 14 rotates by obtaining power from the transportation motor 50 (FIG. 5) described later. Then, the feeding roller 14 feeds the document G to the pair of first transportation rollers 16. At a position, in the first unit 3, facing the feeding roller 14, the separation roller 15 is provided. Rotation torque is applied to the separation roller 15 by a torque limiter (not illustrated), thereby suppressing double feeing of the document G. The feeding roller 14 and the separation roller 15 are, as an example, provided in a central position in the X-axis direction. Note that a separation pad may be provided instead of the separation roller 15. In addition, in the present embodiment, the feeding roller 14 is provided on an upper side with respect to documents mounted on the document supporting portion 11, and the documents are fed from the topmost document. However, the feeding roller 14 may be provided on a lower side with respect to the documents mounted on the document supporting portion 11, and the documents may be fed from the bottommost document.

Downstream with respect to the feeding roller 14 and the separation roller 15, the pair of first transportation rollers 16 that transports the document G is provided. The pair of first transportation rollers 16 has a first roller 17 provided in the second unit 4 and the second roller 18 provided in the first unit 3. The pair of first transportation rollers 16 transports the document G while pressing the document G with the rotation of the pair of first transportation rollers 16. The first roller 17 is provided so as to be able to advance or retreat with respect to the second roller 18 in the B-axis direction.

Both of the first roller 17 and the second roller 18 rotate by obtaining power from the transportation motor 50 (FIG. 5). When the second unit 4 is closed with respect to the first unit 3, the first roller 17 and the second roller 18 come into contact with each other to form a nip. When the second unit 4 is opened with respect to the first unit 3, the first roller 17 is separated from the second roller 18.

Downstream in the +A direction of the pair of first transportation rollers 16, the reading unit 30 that reads an image of the document G is provided. The reading unit 30 has a first reading unit 32 and a second reading unit 33 facing each other in the B-axis direction. In the present embodiment, the first reading unit 32 and the second reading unit 33 are, as an example, configured by a contact image sensor module (CISM). The reading unit 30 reads the document G transported by the pair of first transportation rollers 16.

The first reading unit 32 is provided in the first unit 3. The first reading unit 32 reads the back surface GB of the document G supported by the document supporting portion 11. The second reading unit 33 is provided in the second unit 4. The second reading unit 33 reads the front surface GA of the document G supported by the document supporting portion 11. Note that the second reading unit 33 is provided so as to be movable in the B-axis direction. Downstream in the +A direction of the reading unit 30, a pair of second transportation rollers 20 is provided.

The pair of second transportation rollers 20 has a third roller 21 provided in the second unit 4 and a fourth roller 22 provided in the first unit 3. The pair of second transportation rollers 20 transports the document G while pressing the document G with the rotation of the pair of second transportation rollers 20. The third roller 21 is provided so as to be able to advance or retreat with respect to the fourth roller 22 in the B-axis direction.

Both of the third roller 21 and the fourth roller 22 rotate by obtaining power from the transportation motor 50 (FIG. 5). When the second unit 4 is closed with respect to the first unit 3, the third roller 21 and the fourth roller 22 come into contact with each other to form a nip. When the second unit 4 is opened with respect to the first unit 3, the third roller 21 is separated from the fourth roller 22.

In the apparatus main body 2, the transportation path R is, as an example, configured with the document feeding path R1, the reading transportation path R2, a reverse transportation path R3 (FIG. 1), and a non-reverse transportation path R4 (FIG. 2). Note that since the reverse transportation path R3 and the non-reverse transportation path R4 are switched, both of the reverse transportation path R3 and the non-reverse transportation path R4 do not simultaneously configure the transportation path R.

The document feeding path R1 is a path from a nip position between the feeding roller 14 and the separation roller 15 to a nip of the pair of first transportation rollers 16. The reading transportation path R2 is a linear path extending from the nip of the pair of first transportation rollers 16 to a nip of the pair of second transportation rollers 20 via a position facing the reading unit 30. The reverse transportation path R3 (FIG. 1) is a path located downstream with respect to the reading transportation path R2 when the apparatus main body 2 is in the normal reading posture. The document G after being read is reversed upward in the reverse transportation path R3 and discharged diagonally upward from the first discharge port 37. The reverse transportation path R3 is provided with an upper roller 24, a lower roller 25, and the discharge unit 27.

The non-reverse transportation path R4 (FIG. 2) is a path located downstream with respect to the reading transportation path R2 when the apparatus main body 2 is in the booklet reading posture. The document G after being read is discharged diagonally downward from a second discharge port 38 without being reversed in the non-reverse transportation path R4. Note that the pair of second transportation rollers 20 functions as a pair of discharge rollers that discharges a document from the non-reverse transportation path R4.

As illustrated in FIG. 1, a reversing unit 23 is a unit constituting the reverse transportation path R3. That is, the reversing unit 23 is a unit in which one of the front surface GA and the back surface GB, which are the front and rear of the document G read by the reading unit 30, is reversed and becomes another surface. The reversing unit 23 has, as an example, a switching flap 35, a guide member 36, the upper roller 24, and the lower roller 25.

The switching flap 35 is located downstream in the +A direction with respect to the pair of second transportation rollers 20. The switching flap 35 allows the document G to be transported in one of the reverse transportation path R3 and the non-reverse transportation path R4 by being rotated by a solenoid (not illustrated) and regulates transportation of the document G in another one. That is, the switching flap 35 performs switching between the reverse transportation path R3 and the non-reverse transportation path R4. In the present embodiment, the switching flap 35 is configured so as to rotate linked with switching of the posture of the apparatus main body 2.

The guide member 36 is attached to the main body frame 8. The guide member 36 is located downstream with respect to the switching flap 35 in the reverse transportation path R3. The guide member 36 is fixed to the third unit 5. In the normal reading posture, the guide member 36 is curved so as to have a projected shape in the +Y direction. The guide member 36 extends to the first discharge port 37.

The upper roller 24 is located in the +Z direction with respect to the reverse transportation path R3 in the normal reading posture and is rotated around a shaft in the X-axis direction. The lower roller 25 is located in the −Z direction with respect to the reverse transportation path R3 in the normal reading posture and is rotated around a shaft in the X-axis direction. In addition, the lower roller 25 is driven by the transportation motor 50 (FIG. 5) and transports the document G while rotating together with the upper roller 24.

The discharge unit 27 is located downstream with respect to the upper roller 24 and the lower roller 25. The discharge unit 27 discharges the document G reversed in the reversing unit 23 from the first discharge port 37 in the −A direction. The discharge unit 27 has the first discharge roller 28 provided in the second unit 4 and the second discharge roller 29 provided in the third unit 5.

The first discharge roller 28 is located in the −Y direction with respect to the reverse transportation path R3 in the normal reading posture. The first discharge roller 28 is provided so as to be rotatable around a rotation shaft 28A in the X-axis direction. The second discharge roller 29 is located in the +Y direction with respect to the reverse transportation path R3 in the normal reading posture. The second discharge roller 29 is driven by the transportation motor 50 (FIG. 5) and discharges the document G from the first discharge port 37 by rotating while pinching the document G together with the first discharge roller 28.

As illustrated in FIG. 9, the second discharge roller 29 includes, as an example, a rotation shaft 29A and two contact portions 29B provided in the rotation shaft 29A. The rotation shaft 29A is a columnar member extending in the X-axis direction intersecting with the −A direction. The two contact portions 29B are provided in the rotation shaft 29A at an interval in the X-axis direction. The two contact portions 29B are located at a position in the +X direction and a position in the −X direction with respect to the center in the X-axis direction of the rotation shaft 29A. Each of the two contact portions 29B is a cylindrical portion having an outer diameter larger than the outer diameter of the rotation shaft 29A, and the outer peripheral surface comes into contact with the document G.

Between the two contact portions 29B in the rotation shaft 29A, as an example, propeller members 39 are provided. Each propeller member 39 is a disc-shaped member having an outer diameter larger than the outer diameter of rotation shaft 29A. The outer peripheral portion of the propeller member 39 has a shape in which recesses and projections are repeated in the circumferential direction. The moving member 74 described later is located between a plurality of the contact portions 29B in the X-axis direction when viewed in the +A direction. In addition, the moving member 74 overlaps with the rotation shaft 29A when viewed in the +A direction.

On outer sides of the contact portions 29B in the X-axis direction, discharge flaps 62 are provided. In addition, the discharge flaps 62 are, as an example, provided in the +X direction and the −X direction with respect to the contact portions 29B. Note that the discharge flap 62 in the +X direction and the discharge flap 62 in the −X direction are formed symmetrically with respect to the center in the X-axis direction. Therefore, the discharge flap 62 in the +X direction will be described and the description of the discharge flap 62 in the −X direction will be omitted. The discharge flap 62 is an example of a displacement member that displaces the document G discharged from the discharge unit 27 toward the mounting portion 46.

Figure 10:
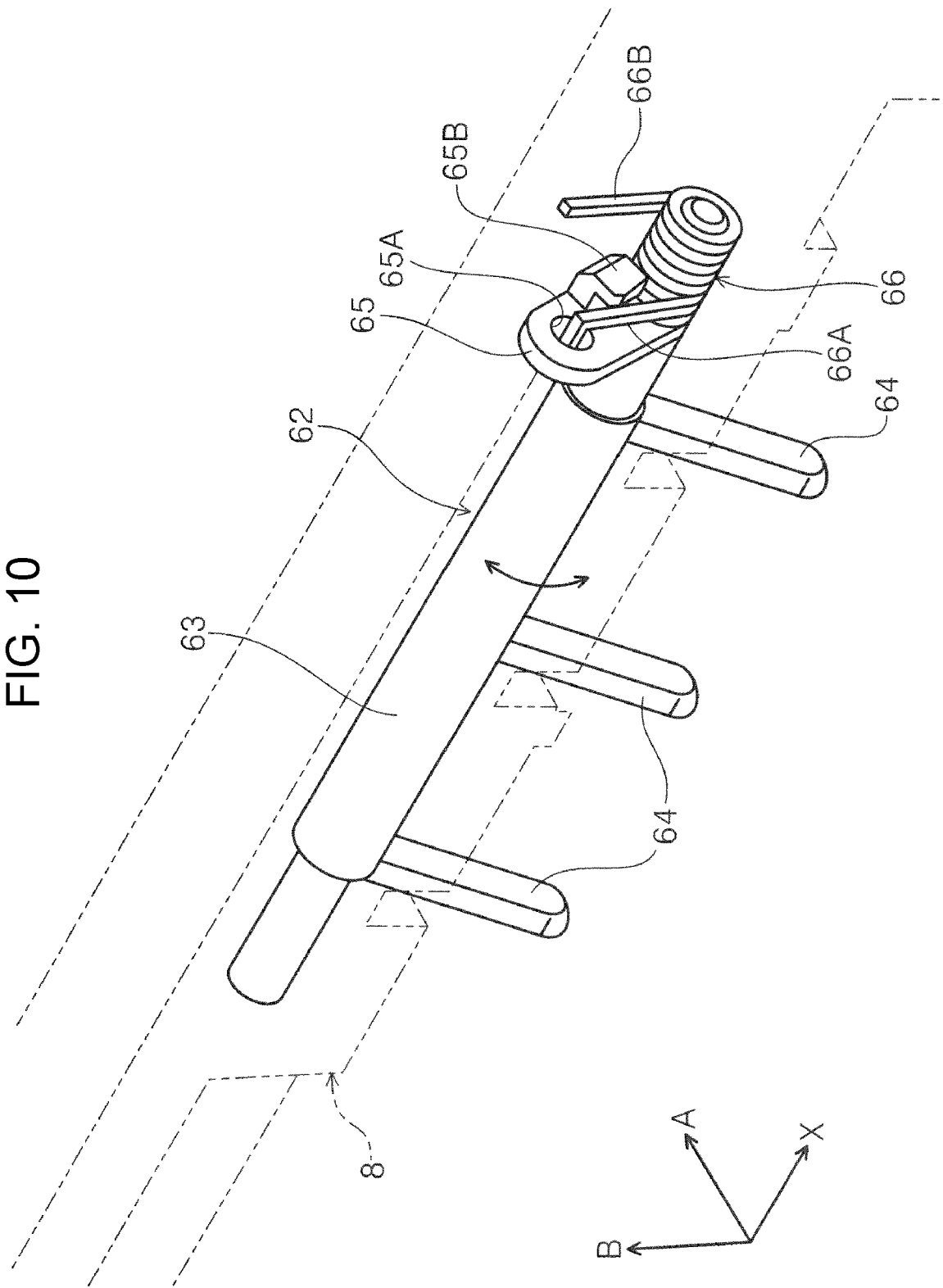
FIG. 10 is a perspective view illustrating a discharge flap provided in the third unit.

As illustrated in FIG. 10, the discharge flap 62 is provided in the main body frame 8. The discharge flap 62 has, as an example, a support shaft portion 63, three extending portions 64, a stretching out portion 65, and a torsion spring 66. The support shaft portion 63 is formed into a columnar shape extending in the X-axis direction. The three extending portions 64 are each formed into a stick shape radially extending toward the mounting portion 46 (FIG. 1) from the outer peripheral surface of the support shaft portion 63. The three extending portions 64 are located at an interval in the X-axis direction.

The stretching out portion 65 is a plate-like portion radially extending from an end portion in the +X direction of the support shaft portion 63. The stretching out portion 65 is provided with a through-hole 65A penetrating the stretching out portion 65 in the X-axis direction and a regulation portion 65B. On an edge portion of the through-hole 65A, one arm 66A of the torsion spring 66 is hooked. When the one arm 66A is about to come off the through-hole 65A, the regulation portion 65B regulates the movement of the arm 66A so as to prevent the arm 66A from falling off. Another arm 66B of the torsion spring 66 is attached to a part of the main body frame 8. In this manner, the discharge flap 62 is pressed toward the mounting portion 46 (FIG. 1) by the torsion spring 66. As a result, a part of the document G that comes into contact with the discharge flap 62 receives a pressing force from the discharge flap 62 so as to be displaced toward the mounting portion 46.

As illustrated in FIG. 5, the control unit 31 is provided in the first unit 3. The control unit 31 controls various functions of the scanner 1 including feeding, transporting, discharging and controlling, and reading and controlling of the document G. A signal from an operation unit (not illustrated) is input to the control unit 31. The control unit 31 controls operation of the transportation motor 50 and the posture switching motor 40. In the present embodiment, each motor is a DC motor. A signal from a mounting detection unit, a double feeding detection unit, a document detection unit, a posture detection sensor, and the like is also input to the control unit 31.

The transportation motor 50 is an example of a driving unit that rotates each roller of the scanner 1. The transportation motor 50 is provided at an end portion in the −X direction of the apparatus main body 2. The rotation shaft of the transportation motor 50 is provided with a driving pulley 51. A driving force is transported to a driven pulley 53 from the driving pulley 51 via a belt 52. The driving force transported to the driven pulley 53 is transported to each roller via a group of gears (not illustrated).

Figure 11:
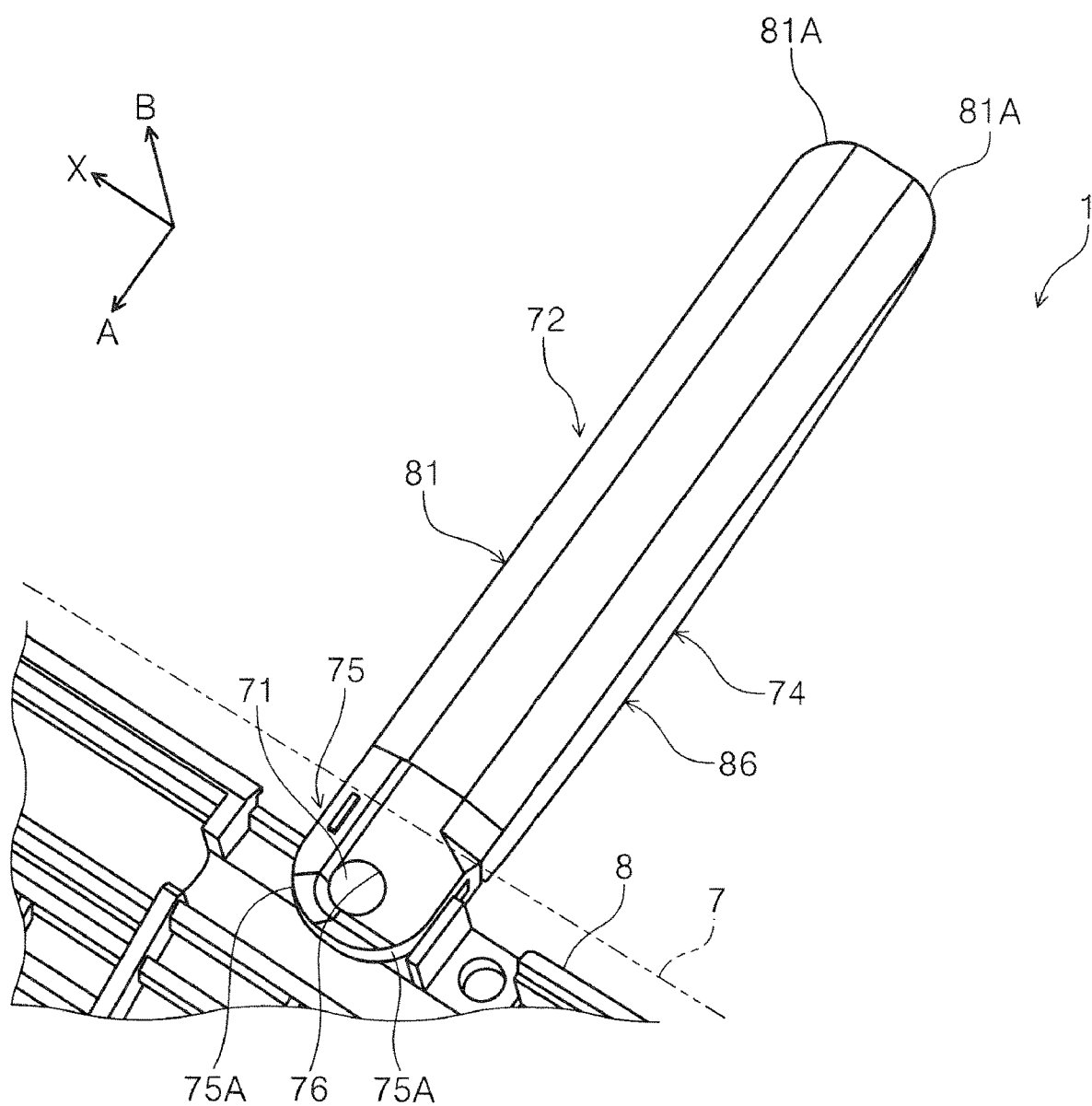
FIG. 11 is a perspective view illustrating a pressing portion in a used state.
Figure 12:
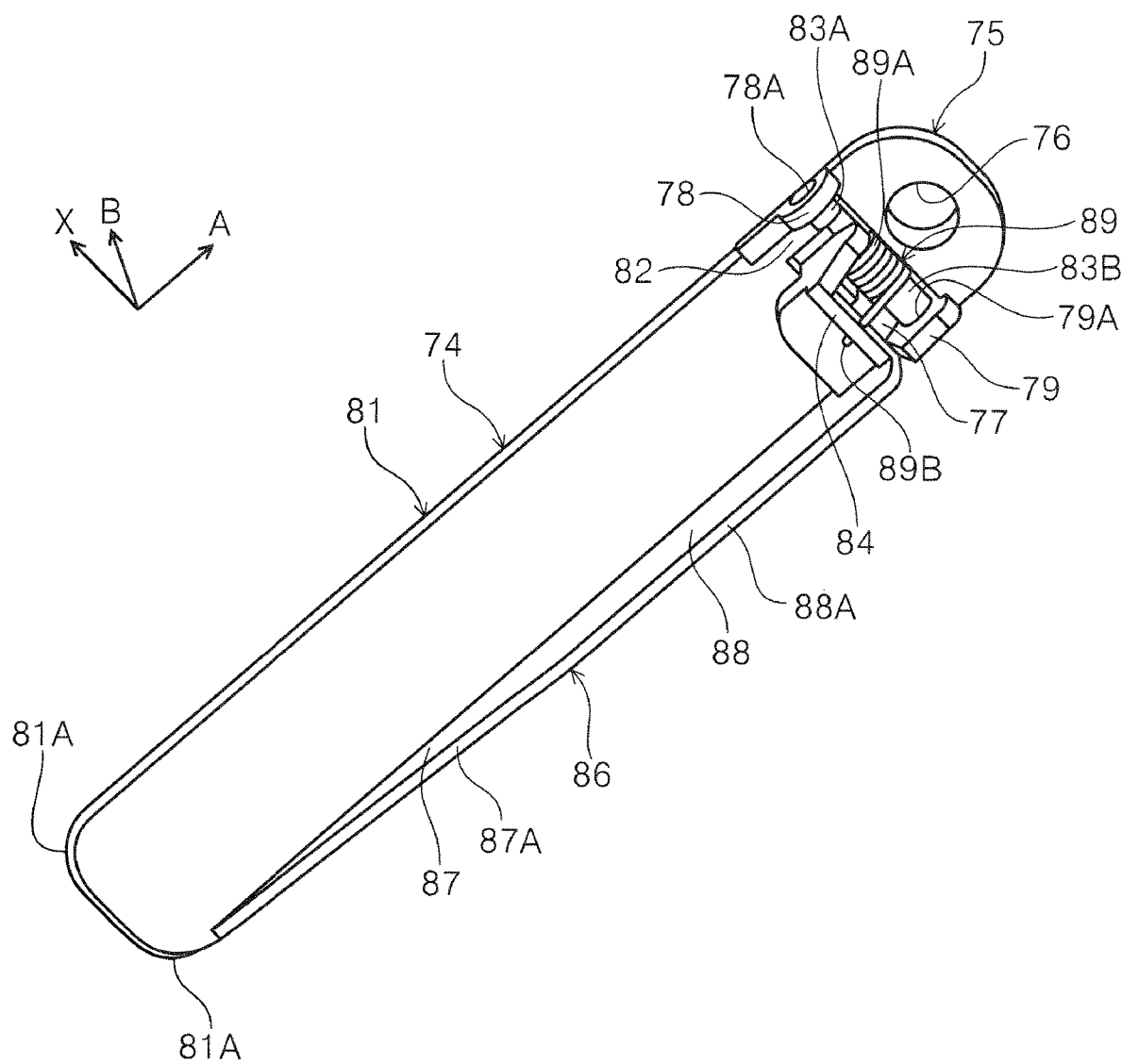
FIG. 12 is a perspective view illustrating a back side of the moving member and an elastic member.

As illustrated in FIG. 11, the scanner 1 includes the pressing portion 72. The pressing portion 72 presses the document G toward the mounting portion 46 (FIG. 1). Specifically, the pressing portion 72 has the moving member 74 and an elastic member 89 (FIG. 12). The moving member 74 is provided so as to be movable toward the mounting portion 46. The elastic member 89 applies an elastic force to the moving member 74 such that the moving member 74 comes into contact with the document G on the mounting portion 46. Note that the position and direction of each portion of the moving member 74 will be described assuming that the moving member 74 is located at the first facing position.

A part in the X-axis direction in an end portion in the −A direction of the main body frame 8 is provided with the support shaft 71 having a columnar shape. The support shaft 71 projects in the +B direction from the main body frame 8 toward the cover member 7. The support shaft 71 rotatably supports the moving member 74 in the X-A plane. The moving member 74 is disposed so as to overlap with a center CP (FIG. 3) in the X-axis direction of the document G when viewed in the B-axis direction of the document G on the mounting portion 46 (FIG. 3). Note that the attaching position of the moving member 74 with respect to the main body frame 8 is on the +B direction side in the B-axis direction from the nip position between the first discharge roller 28 (FIG. 1) and the second discharge roller 29 (FIG. 1). In addition, the attaching position of the moving member 74 with respect to the main body frame 8 is on the +B direction side in the B-axis direction from the rotation shaft 28A (FIG. 1) of the first discharge roller 28.

The moving member 74 has, as an example, a first rotation portion 75 that is rotatable along the X-A plane and a second rotation portion 81 that is rotatable along the A-B plane coupled to the first rotation portion 75. The first rotation portion 75 is formed into a plate shape having a prescribed thickness in the B-axis direction. The first rotation portion 75 has an R portion 75A at two locations when viewed in the B-axis direction. A round hole portion 76 penetrating the first rotation portion 75 in the B-axis direction is formed in first rotation portion 75. The inner diameter of the hole portion 76 is substantially the same as the outer diameter of the support shaft 71. The support shaft 71 is inserted into the hole portion 76. As a result, the first rotation portion 75 is rotatable around the support shaft 71 along the X-A plane. Note that the cover member 7 functions as a stopper that prevents the support shaft 71 from coming off the first rotation portion 75.

As illustrated in FIG. 12, on the surface in the −B direction of the first rotation portion 75, a recessed portion 77 is formed in a portion in the −A direction with respect to the hole portion 76. Moreover, in both end portions in the X-axis direction of the recessed portion 77, a vertical wall portion 78 and a vertical wall portion 79 stretching out in the −B direction are formed. In the recessed portion 77, a part of the elastic member 89 described later is stored. The vertical wall portion 78 is located in the +X direction with respect to the recessed portion 77 and is formed into a semi-circular shape when viewed in the X-axis direction. In the vertical wall portion 78, a coupling hole 78A penetrating the vertical wall portion 78 in the X-axis direction is formed. The vertical wall portion 79 is located in the −X direction with respect to the recessed portion 77 and is formed into a polygonal shape when viewed in the X-axis direction. In the vertical wall portion 79, a coupling hole 79A penetrating the vertical wall portion 79 in the X-axis direction is formed.

The second rotation portion 81 is formed into a plate shape having a prescribed thickness in the B-axis direction. Specifically, the second rotation portion 81 is formed into a rectangular shape whose length in the A-axis direction is greater than the length in the X-axis direction. The length in the A-axis direction of the second rotation portion 81 is greater than the length in the A-axis direction of the first rotation portion 75. Note that the length in the A-axis direction of the second rotation portion 81 is set so as to extend from the first rotation portion 75 to a portion where the document G should be pressed.

In addition, the second rotation portion 81 has an R portion 81A at two locations when viewed in the B-axis direction. When viewed in the B-axis direction, the cross-sectional shape on the X-B plane of the second rotation portion 81 is, as an example, an isosceles trapezoid shape with the upper base located in the +B direction and the lower base located in the −B direction. An end portion in the +A direction of the second rotation portion 81 is provided with a projecting portion 82 projecting in the +A direction, a coupling shaft 83A and a coupling shaft 83B each having a columnar shape, and an engaging portion 84.

At an end portion in the +A direction of the second rotation portion 81, the projecting portion 82 projects in the +A direction from a position sifted in the +X direction from the center in the X-axis direction. The projecting portion 82 is formed into a U-shape when viewed in the B-axis direction. The coupling shaft 83A extends in the +X direction from one side of the projecting portion 82. The coupling shaft 83B extends in the −X direction from another side of the projecting portion 82. The length in the X-axis direction of the coupling shaft 83B is greater than the length in the X-axis direction of the coupling shaft 83A. The coupling shaft 83A and the coupling shaft 83B are located on the same shaft line (not illustrated). The engaging portion 84 projects in the −B direction from the projecting portion 82. The engaging portion 84 is a portion where an arm (not illustrated) of the elastic member 89 described later is engaged with.

An end portion in the −X direction of the second rotation portion 81 is provided with a side wall portion 86. The side wall portion 86 projects in the −B direction from the second rotation portion 81. The side wall portion 86 is formed into a plate shape having a prescribed thickness in the X-axis direction. The side wall portion 86 has a structure in which a first side wall portion 87 located in the −A direction and a second side wall portion 88 located in the +A direction are integrally formed. Note that when the moving member 74 is stored in the storage portion 13 (FIG. 9), the side wall portion 86 is exposed in the −A direction. In other words, when the moving member 74 is operated and rotated while the moving member 74 is in a stored state, the side wall portion 86 functions as a holding portion to be held by the operator. In addition, the side wall portion 86 functions as a lid portion that closes the opening of the storage portion 13. As a result, dust or the like is suppressed from entering the storage portion 13.

When viewed in the X-axis direction, the first side wall portion 87 has a triangular shape whose height in the −A direction is smaller than the height in the +A direction. The first side wall portion 87 has a first facing surface 87A. The first facing surface 87A is an inclined surface extending from an end portion in the −A direction of a second facing surface 88A toward a position in the −A direction and the −B direction. In addition, the first facing surface 87A is an example of a first surface facing the mounting surface 46A (FIG. 3). When viewed in the X-axis direction, the second side wall portion 88 has a rectangular shape that is long in the A-axis direction. An end surface in the −B direction of the second side wall portion 88 is the second facing surface 88A. The second facing surface 88A is a plane extending along the X-A plane. In addition, the second facing surface 88A is an example of a second surface facing the mounting surface 46A. Moreover, the second facing surface 88A is located upstream in the −A direction with respect to the first facing surface 87A. In this manner, the moving member 74 has the first facing surface 87A and the second facing surface 88A.

The coupling shaft 83A is inserted into the coupling hole 78A. The coupling shaft 83B is inserted into the coupling hole 79A. As a result, the second rotation portion 81 is rotatable around the coupling shafts 83A and 83B relatively to the first rotation portion 75. Specifically, the second rotation portion 81 is rotatable so as to draw an arc-shaped locus on the A-B plane.

The elastic member 89 is, as an example, configured as a torsion spring. The elastic member 89 has a winding wire portion 89A, an arm 89B extending from one end of the winding wire portion 89A, and an arm (not illustrated) extending from another end of the winding wire portion 89A. A part of the winding wire portion 89A is stored in the recessed portion 77. A tip end portion of the arm (not illustrated) is brought into contact with the recessed portion 77. A tip end portion of the arm 89B is engaged with the engaging portion 84. As a result, an elastic force toward the document G is applied to the second rotation portion 81 by the elastic member 89.

Figure 13:
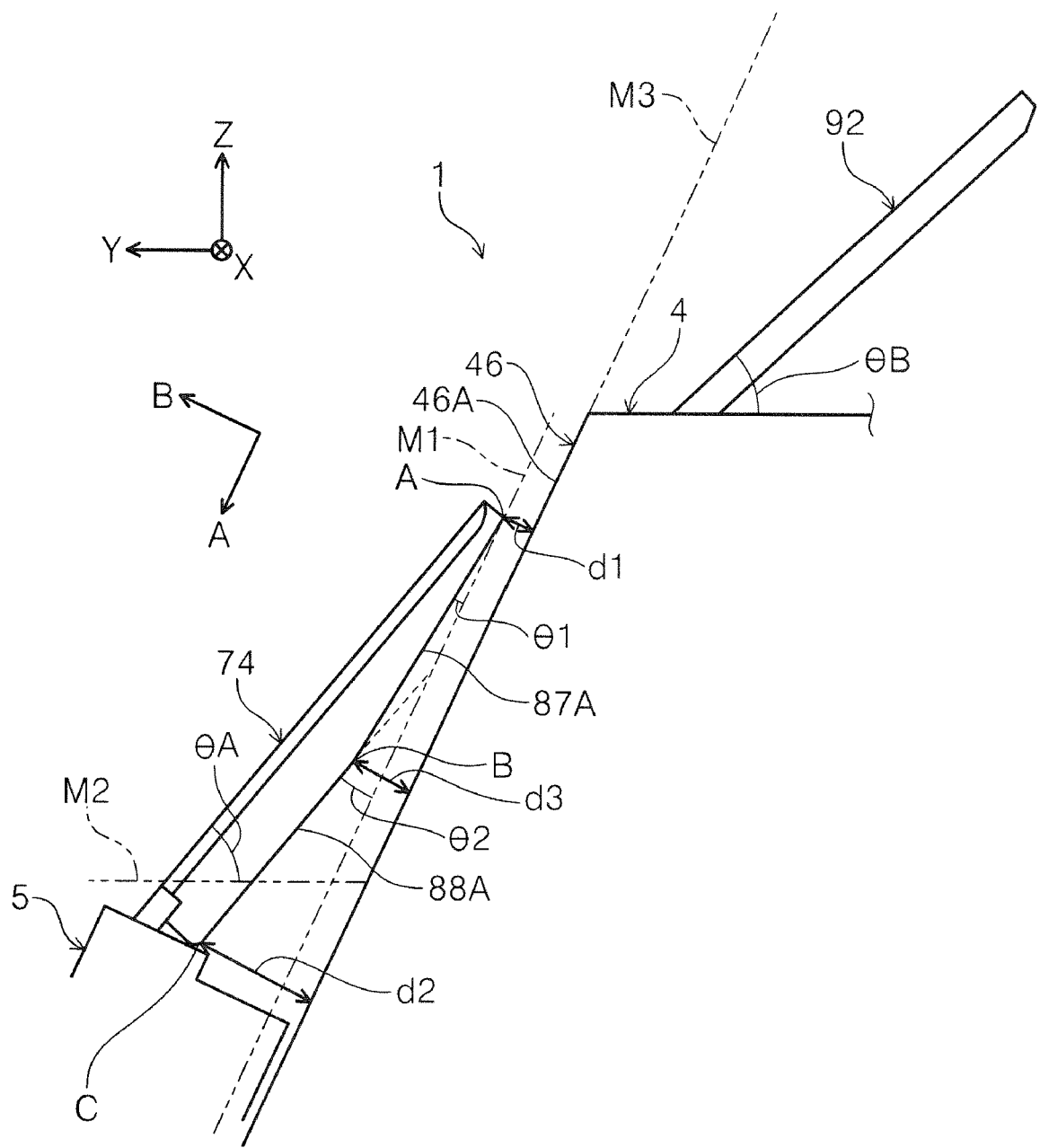
FIG. 13 is a schematic view illustrating an arrangement relation between the moving member and a supporting member.

FIG. 13 illustrates an arrangement relation between the mounting portion 46, the moving member 74, and the supporting member 92 when the scanner 1 is viewed in the +X direction. Note that the moving member 74 is, as an example, illustrated when located at the second facing position. A virtual plane M1 indicated by a chain double-dashed line M1 indicates a virtual plane obtained by moving the mounting surface 46A in parallel in the +B direction. The virtual plane M1, as an example, passes a point A that is an end point in the −A direction of the second rotation portion 81. Here, the angle formed by the virtual plane M1 and the first facing surface 87A is the first angle θ1 [°]. In addition, the angle formed by the virtual plane M1 and the extended line of the second facing surface 88A is the second angle θ2 [°]. The first angle θ1 [°] is smaller than the second angle θ2 [°].

The point A indicates a position of the downstream end in the −A direction of the moving member 74. A point B indicates a boundary position between the first facing surface 87A and the second facing surface 88A. A point C indicates a position of the upstream end in the −A direction of the second facing surface 88A. Here, an interval corresponding to the shortest distance between the point A and the mounting surface 46A is a first interval d1 [mm]. In addition, an interval corresponding to the shortest distance between the point C and the mounting surface 46A is a second interval d2 [mm]. Moreover, an interval corresponding to the shortest distance between the point B and the mounting surface 46A is a third interval d3 [mm]. In the present embodiment, each value is set such that the first interval d1<the third interval d3<the second interval d2 is satisfied. In other words, the first interval d1 between the downstream end in the −A direction in the moving member 74 and the mounting portion 46 is smaller than the second interval d2 between the upstream end in the −A direction of the moving member 74 and the mounting portion 46. Note that in the present embodiment, the point A, which is the position of the downstream end in the −A direction of the moving member 74, is located between the rotation shaft 28A of the first discharge roller 28 (see FIG. 1) and the mounting surface 46A in the B-axis direction. In addition, in the present embodiment, the point A, which is the position of the downstream end in the −A direction of the moving member 74, is located between the nip between the first discharge roller 28 and the second discharge roller 29, and the mounting surface 46A in the B-axis direction. In addition, in the present embodiment, the point A, which is the position of the downstream end in the −A direction of the moving member 74, is located between the point C, which is the position of the upstream end in the −A direction of the moving member 74, and the mounting surface 46A in the B-axis direction.

A virtual plane M2 indicated by a chain double-dashed line M2 indicates a horizontal plane extending along the X-Y plane. The Y-axis direction is an example of the horizontal direction. Here, a second inclination angle θB [°] formed by the supporting member 92 described later and the Y-axis direction is smaller than a first inclination angle θA [°] formed by the moving member 74 and the virtual plane M2, that is, the Y-axis direction. In other words, the supporting member 92 is disposed while being more inclined toward the horizontal plane than the moving member 74.

The supporting member 92 is not located on the moving member 74 side with respect to a virtual line M3 obtained by extending the mounting surface 46A of the mounting portion 46 in the −A direction, which is the supporting member 92 side. In other words, the supporting member 92 is located in the −B direction with respect to the virtual line M3.

As illustrated in FIG. 14, the apparatus main body 2 is provided with the supporting member storage portion 91 and the supporting member 92. The supporting member 92 is located downstream of the mounting portion 46 in the −A direction. The supporting member 92 is disposed at the second position by being rotated from the first position, which is the position where the supporting member 92 is stored in the supporting member storage portion 91. In addition, the supporting member 92 projects in the −A direction from the mounting portion 46 at the second position. As a result, the supporting member 92 is capable of supporting a portion, of the document G, located in the −A direction from the mounting portion 46.

Figure 15:
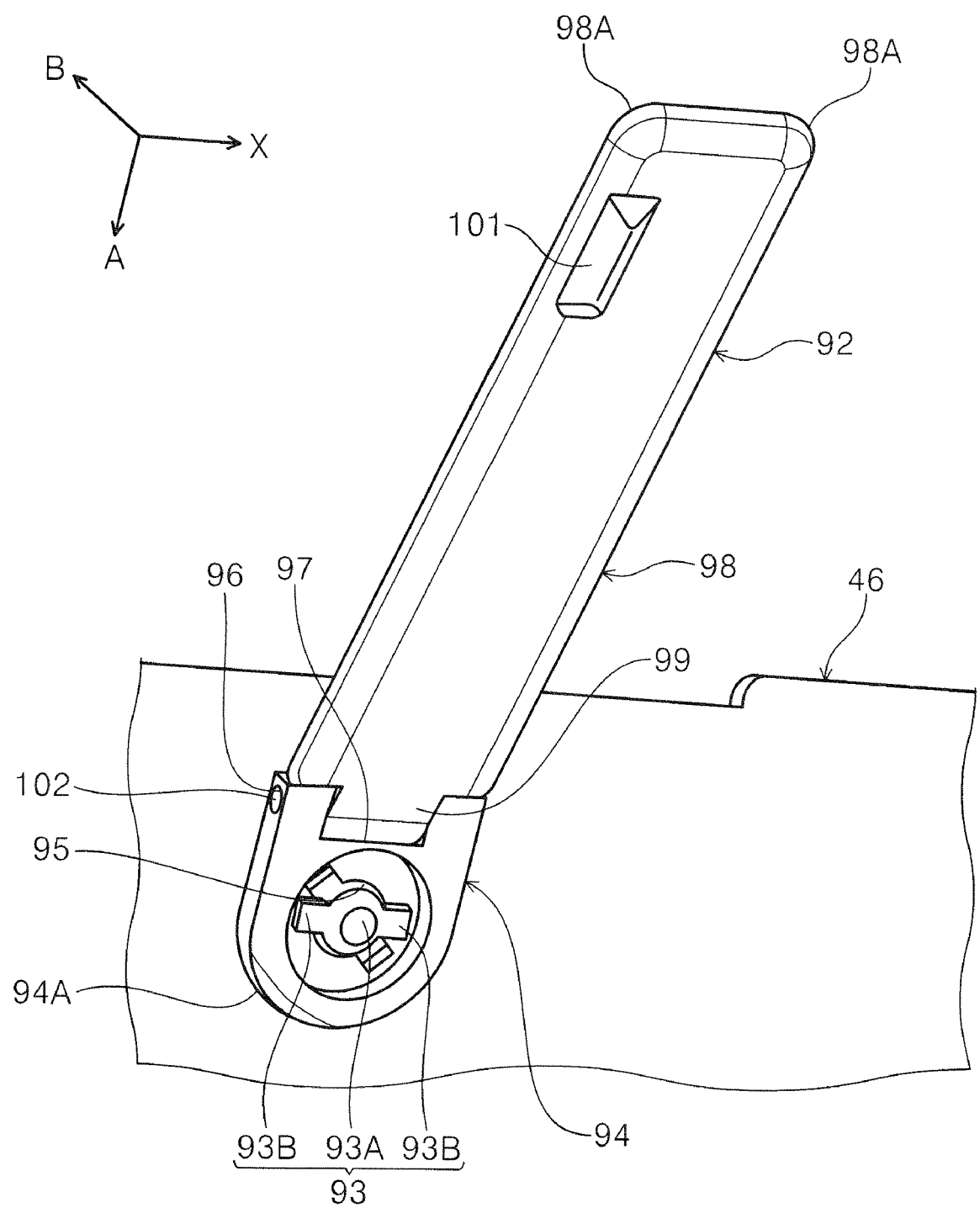
FIG. 15 is a perspective view of the supporting member.

As illustrated in FIG. 15, a part of the mounting portion 46 in the X-axis direction at an end portion in the −A direction is provided with a columnar-shaped support shaft 93. The support shaft 93 projects in the −B direction from the mounting portion 46. The support shaft 93 rotatably supports the supporting member 92 in the X-A plane. The support shaft 93 has a columnar-shaped shaft portion 93A and two projecting portions 93B projecting from end portions in the −B direction of the shaft portion 93A to radially outside the shaft portion 93A.

The supporting member 92 has, as an example, a lower rotation portion 94 that is rotatable along the X-A plane and an upper rotation portion 98 that is coupled to the lower rotation portion 94 and rotatable along the A-B plane. Note that disposition of each portion will be described assuming that the supporting member 92 is located at the second position. The lower rotation portion 94 is formed into a plate shape having a prescribed thickness in the B-axis direction. The lower rotation portion 94 has an R portion 94A when viewed in the B-axis direction. In the lower rotation portion 94, a hole portion 95 penetrating the lower rotation portion 94 in the B-axis direction is formed. The support shaft 93 is inserted into the hole portion 95.

Only when the lower rotation portion 94 is located at a specific rotation position, the two projecting portions 93B is capable of being inserted into the hole portion 95. In other words, the lower rotation portion 94 is held so as not to come off the support shaft 93 at a position other than the specific rotation position In an end portion in the −A direction of the lower rotation portion 94, a coupling hole 96 penetrating the lower rotation portion 94 in the X-axis direction is formed. In addition, in an end portion in the −A direction of the lower rotation portion 94 and the central portion in the X-axis direction, a recessed portion 97 is formed.

The upper rotation portion 98 is formed into a plate shape having a prescribed thickness in the B-axis direction. Specifically, the upper rotation portion 98 is formed into a rectangular shape whose length in the A-axis direction is greater than the length in the X-axis direction. The length in the A-axis direction of the upper rotation portion 98 is greater than the length in the A-axis direction of the lower rotation portion 94. Note that the length in the A-axis direction of the upper rotation portion 98 is set so as to be able to come into contact with the document G. In addition, the upper rotation portion 98 has an R portion 98A at two locations when viewed in the B-axis direction. When viewed in the B-axis direction, the cross-sectional shape of the X-B plane of the upper rotation portion 98 is, as an example, an isosceles trapezoid shape with the lower base located in the +B direction and the upper base located in the −B direction.

In the central portion in the X-axis direction of an end portion in the +A direction of the upper rotation portion 98, a projecting portion 99 projecting in the +A direction is provided. In the projecting portion 99, a through-hole (not illustrated) penetrating the projecting portion 99 in the X-axis direction is formed. In an end portion in the −X direction of an end portion in the −A direction of the upper rotation portion 98, a holding portion 101 projecting in the −B direction from the upper rotation portion 98 is provided. The holding portion 101 is held by the operator when the supporting member 92 is rotated from the supporting member storage portion 91 (FIG. 14).

In a state where the projecting portion 99 is inserted into the recessed portion 97, as a pin 102 is press-fitted to the coupling hole 96 and a through-hole (not illustrated), the lower rotation portion 94 and the upper rotation portion 98 are coupled to each other. In this manner, the lower rotation portion 94 is capable of rotating in the X-A plane, and the upper rotation portion 98 is capable of rotating along the A-B plane. Note that the posture of the lower rotation portion 94 can be held at an arbitrary rotation position by a friction force generated between the lower rotation portion 94 and the mounting portion 46, and the like. The posture of the upper rotation portion 98 is held at an arbitrary rotation position by a friction force generated between the upper rotation portion 98 and the recessed portion 97, and the like.

Next, an action and effect of the scanner 1 of the embodiment will be described. Note that as for each configuration of the scanner 1, each configuration and each reference numeral illustrated in FIGS. 1 to 15 are referred to, and thus description of individual figure numbers may be omitted.

Figure 16:
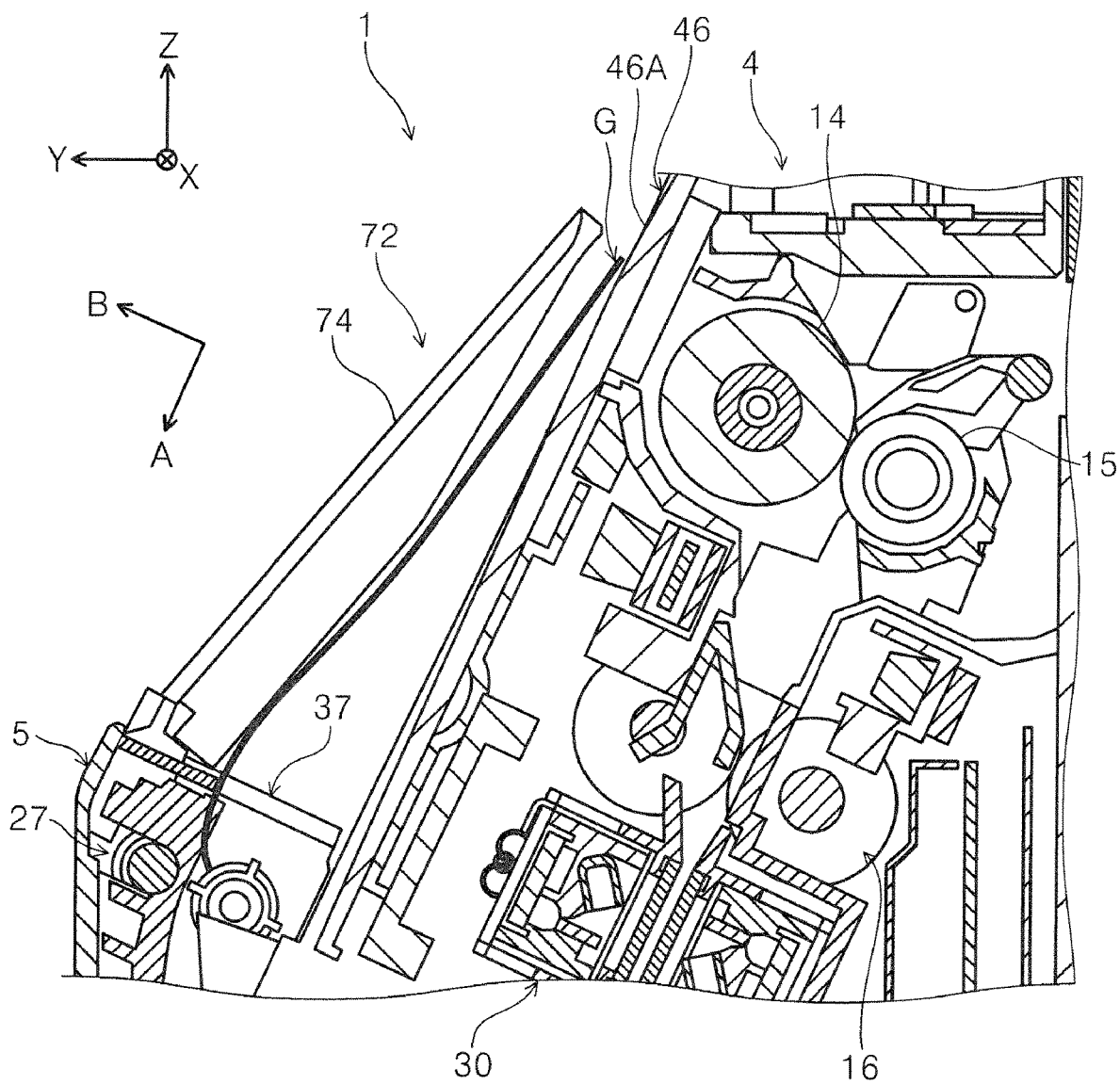
FIG. 16 is a partial sectional view illustrating a state in which a document that is discharged from the discharge unit and comes into contact with the discharge flap is pressed by the pressing portion.

As illustrated in FIG. 16, in a state where the moving member 74 is located at a facing position, the discharge unit 27 discharges the document G. As a result, the document G is discharged in the −A direction from the first discharge port 37. The central portion in the X-axis direction of the document G that is being discharged comes into contact with the moving member 74 and is pressed in the −B direction toward the mounting portion 46. As a result, the central portion in the X-axis direction of the document G is suppressed from being buckled in the +B direction by an action of its dead weight. In addition, the interval between the moving member 74 and the mounting portion 46 increases as approaching the first discharge port 37. As a result, a large pressing force is suppressed from acting, from the moving member 74, on a part of the document G immediately after being discharged from the first discharge port 37, as a result of which a part of the document G that is moving around the first discharge port 37 is suppressed from being bent.

Figure 17:
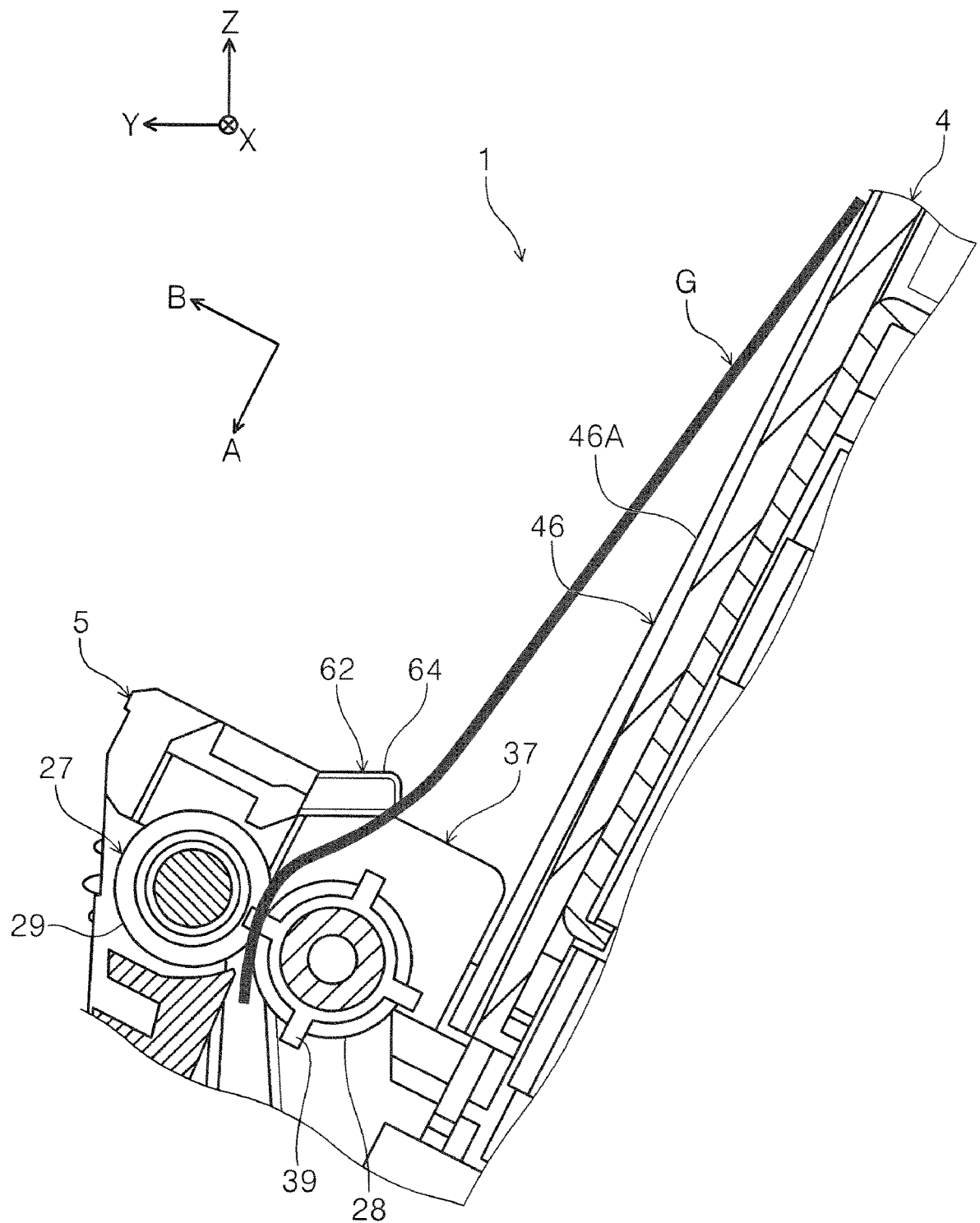
FIG. 17 is a partial sectional view illustrating a state in which a proceeding direction of the document discharged from the discharge unit is changed by the discharge flap.

As illustrated in FIG. 17, in a portion on an outer side of the central portion in the X-axis direction of the document G that is discharged, the discharge flap 62 applies a pressing force in the −B direction to the document G. As a result, in particular, at a timing when the upstream end in the −A direction of the document G passes through the discharge unit 27, the document G can be separated from the nip between the first discharge roller 28 and the second discharge roller 29, and thus a part of the document G is unlikely to remain in the discharge unit 27.

Figure 18:
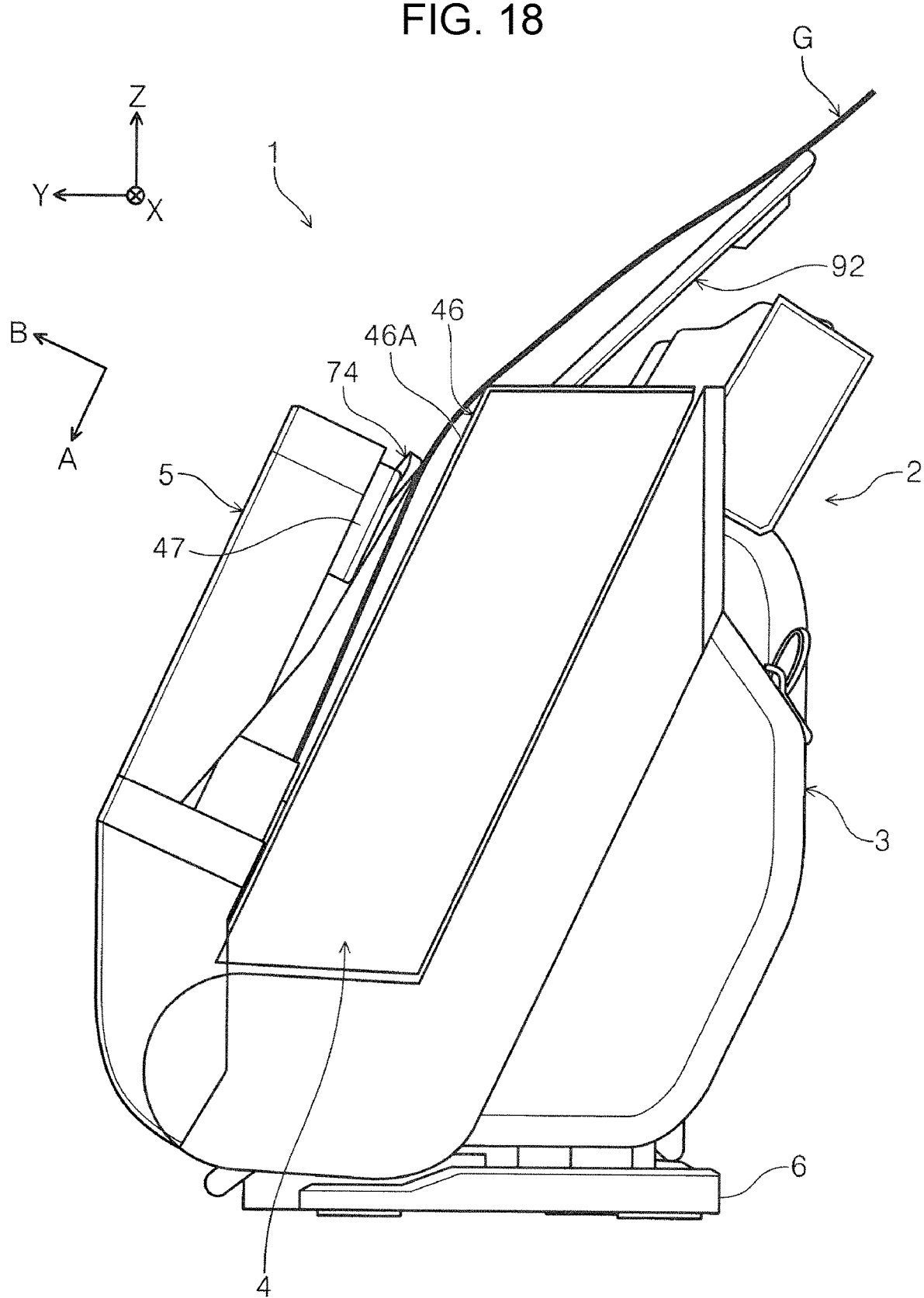
FIG. 18 is a side view illustrating a state in which the document discharged from the discharge unit is pressed by the pressing portion and supported by the supporting member.

As illustrated in FIG. 18, a portion, of the document G that has been discharged, exceeding the end portion in the −A direction of the mounting portion 46 is likely to be bent down in the −Z direction by the action of its dead weight. Here, since the supporting member 92 supports the document G, the downstream portion, of the document G, in the −A direction from the moving member 74 is suppressed from being bent.

As described thus far, after information is read from the document G, the front and rear of the document G are reversed by the reversing unit 34. After the reversed document G is discharged by the discharge unit 27, the document G is mounted on the mounting portion 46. The dead weight of the document G acts on the document G mounted on the mounting portion 46. Therefore, a part of the document G is deformed in a direction separating from the mounting portion 46, that is, the document G may be buckled. Here, according to the scanner 1, as the moving member 74, to which an elastic force is applied by the elastic member 89, moves toward the mounting portion 46 and comes into contact with the document G, the moving member 74 presses the document G against the mounting portion 46. As a result, since the elastic force acts as a reaction force to the dead weight of the document G, the document G can be suppressed from being buckled. Moreover, as the document G is suppressed from being buckled, the discharge space of the document G that is discharged next is suppressed from being closed by the document G that has been already discharged, and thus the stacking performance of a plurality of the documents G can be suppressed from being reduced.

According to the scanner 1, compared to a configuration in which the moving member 74 presses an end portion in the X-axis direction of the document G, the document G can be suppressed from being buckled evenly in the X-axis direction. According to the scanner 1, since the discharge flap 62 displaces the document G toward the mounting portion 46, the upstream end in the −A direction of the document G can be suppressed from remaining in the discharge unit 27.

In the document G that is discharged from the discharge unit 27, compared to an upstream portion, a downstream portion in the −A direction is likely to be deformed by the dead weight of the document G. According to the scanner 1, since the downstream portion of the document G that is likely to be deformed, compared to the upstream portion, easily comes into contact with the moving member 74, the document G can be suppressed from being deformed by its dead weight.

According to the scanner 1, since the first angle θ1 is smaller than the second angle θ2, the first facing surface 87A located downstream in the −A direction is closer to the mounting surface 46A than the second facing surface 88A located upstream. As a result, compared to a configuration in which the first angle θ1 is equal to or larger than the second angle θ2, the contact surface between a portion of the document G that is likely to be deformed and the moving member 74 can be increased, as a result of which the document G can be suppressed from being deformed by its dead weight. Moreover, since the interval between the second facing surface 88A and the mounting surface 46A is larger than the interval between the first facing surface 87A and the mounting surface 46A, at the early stage of discharging the document G, the moving member 74 is unlikely to come into contact with the document G. As a result, at the early stage of discharging the document G in the discharge unit 27, a load imposed on the document G can be reduced.

According to the scanner 1, the moving member 74 is located at the storage position by being rotated from the facing position. That is, the moving member 74 is stored in the storage portion 13. As a result, when the document G mounted on the mounting portion 46 is taken out, the document G can be suppressed from being caught in the moving member 74. According to the scanner 1, even when the document G has a size sticking out of the mounting portion 46 in the −A direction, since the supporting member 92 supports the portion of the document G sticking out of the mounting portion 46, the document G can be suppressed from being deformed.

According to the scanner 1, an upstream portion in the −A direction of the document G is pressed against the mounting portion 46 by the moving member 74. Moreover, a downstream portion in the −A direction of the document G is supported by the supporting member 92. Here, the upstream portion of the document G that comes into contact with the moving member 74 and the downstream portion of the document G that comes into contact with the supporting member 92 are aligned in the −A direction. As a result, compared to a configuration in which the moving member 74 and the supporting member 92 are positioned and sifted in the X-axis direction, the document G can be suppressed from being deformed.

According to the scanner 1, as the supporting member 92 is rotated from the second position to the first position, the supporting member 92 is stored in the supporting member storage portion 91. As a result, when the scanner 1 is not used, the size of the scanner 1 can be reduced. According to the scanner 1, since the supporting member 92 does not project on the moving member 74 side with respect to the virtual line M3, when the document G that is being discharged moves along the mounting surface 46A, the document G can be suppressed from being caught in the supporting member 92.

According to the scanner 1, as the third unit 5 is moved with respect to the second unit 4, the second discharge roller 29 is separated from the first discharge roller 28. As a result, since the discharge unit 27 is released, the document G for which discharging has been interrupted in the discharge unit 27 is easily removed. According to the scanner 1, the operation unit 42 is located outside the moving region A1 of the moving member 74, the moving state of the moving member 74 is easily confirmed.

According to scanner 1, when viewed in the X-axis direction, since the operation unit 42 overlaps with at least a part of the moving region A1, the size of the scanner 1 can be reduced. According to the scanner 1, when viewed from the operation side of the touch panel 44, since at least a part of the buzzer 47 is hidden on the mounting portion 46 side with respect to the touch panel 44, the size of the operation unit 42 can be reduced in the X-axis direction intersecting with the −A direction.

The scanner 1 according to the embodiment of the present disclosure basically has the above-described configurations, but it is of course possible to partially change, omit, and combine the configurations without departing from the scope of the present disclosure.

Modifications

Figure 19:
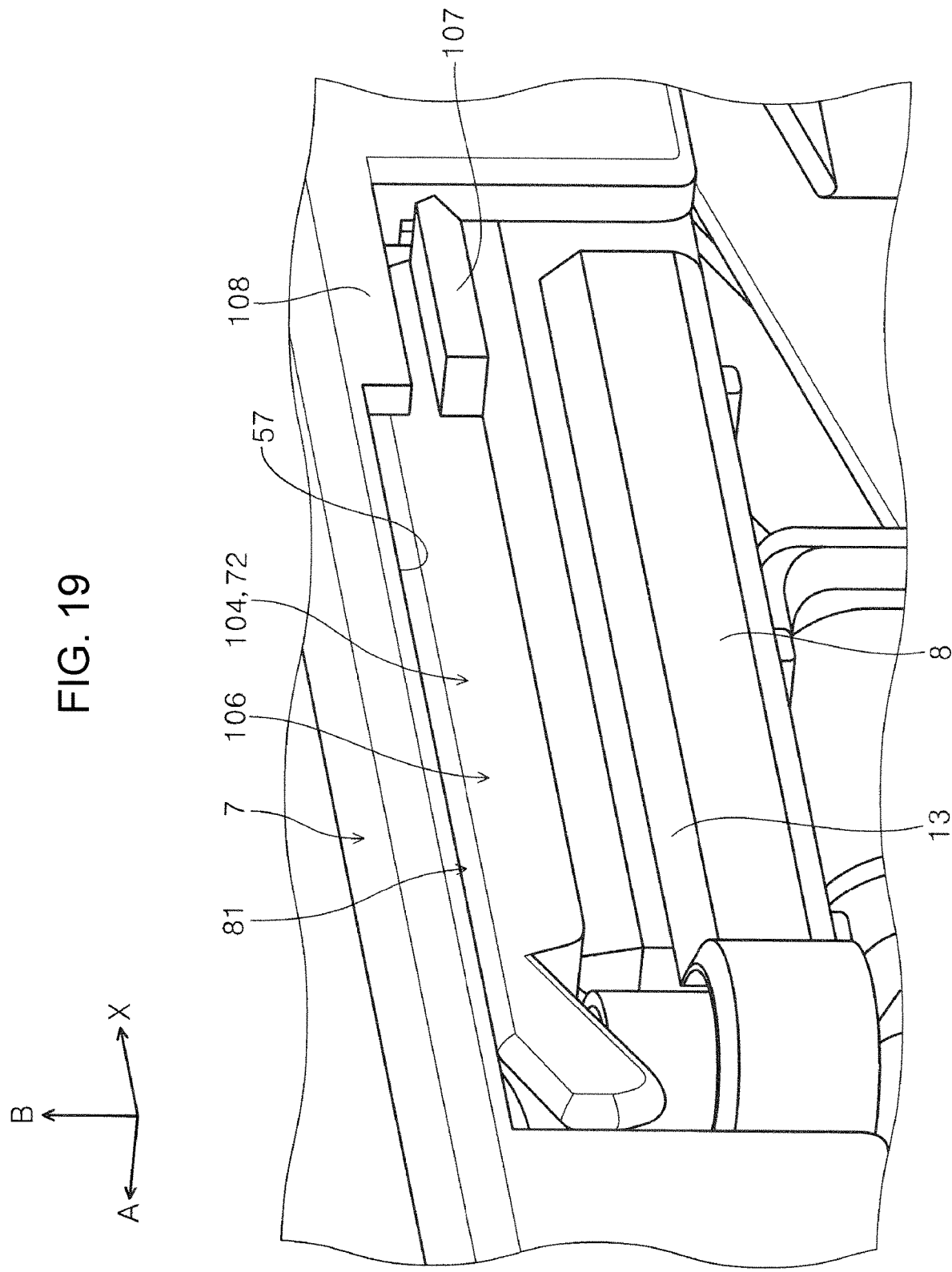
FIG. 19 is a perspective view illustrating a state in which, in a scanner of a modification, a moving member is stored in a storage portion.

As illustrated in FIG. 19, a moving member 104 may be used. Note that arrangement of each portion will be described assuming that the moving member 104 is located at the storage position. The moving member 104 is provided in place of the moving member 74 (FIG. 12) of the pressing portion 72. The configurations other than the moving member 74 in the pressing portion 72 are the same. In the second rotation portion 81, the moving member 104 has a configuration in which a side wall portion 106 is provided in place of the side wall portion 86 (FIG. 12). The side wall portion 106 stretches out in the −B direction. The side wall portion 106 is formed into a plate shape having a predetermined thickness in the A-axis direction. An end portion in the +X direction of the side wall portion 106 is provided with a holding portion 107 projecting in the −A direction from the side wall portion 106.

On the other hand, in an edge portion of the opening portion 57 in the cover member 7, in a corner portion in the +X direction and the +B direction, a plate-like regulation portion 108 is provided. Specifically, the regulation portion 108 is provided at a position where the regulation portion 108 can come into contact in the A-axis direction with an end portion in the +X direction of the side wall portion 106 with respect to the moving member 104 that is located at the storage position. As a result, the regulation portion 108 regulates the moving member 104 located at the storage position from being rotated to the facing position. For releasing the rotation regulation by the regulation portion 108, while the holding portion 107 is held, the second rotation portion 81 is rotated in the −B direction. As a result, when the second rotation portion 81 is rotated to the facing position, the end portion in the +X direction of the second rotation portion 81 does not come into contact with the regulation portion 108, and the moving member 104 is capable of rotating to the facing position.

As illustrated in FIG. 20, a spring member 112 that presses the moving member 104 from the storage position to the facing position may be provided. The spring member 112 is, as an example, a torsion spring in which the B-axis direction is the central shaft direction. As a result, the moving member 104 that has exceeded the regulation portion 108 (FIG. 19) in the −B direction is automatically rotated to the facing position by a pressing force of the spring member 112. Note that when the moving member 104 is stored at the storage position, the moving member 104 is manually stored. In FIG. 20, the spring member 112 is indicated by a solid line so as to be clearly indicated.

Other Modifications

In the scanner 1, by the power of the posture switching motor 40, the posture of the apparatus main body 2 with respect to the stand 6 is switched, but alternatively, or in addition to this configuration, the posture of the apparatus main body 2 may be switched by manual operation of the user.

In the scanner 1, the discharge unit 27 may have only one contact portion 29B. The moving member 74 may be located outside the two contact portions 29B in the X-axis direction. The discharge flap 62 may be provided inside the contact portions 29B in the X-axis direction.

Alternatively, the discharge flap 62 does not have to be present. The first interval d1 may be equal to or larger than the second interval d2. The first angle θ1 may be equal to or larger than the second angle θ2.

The cover member 7 does not have to have the storage portion 13. The moving member 74 may be held at the facing position without being stored in the storage portion 13. A plurality of the moving members 74 may be provided at an interval in the X-axis direction. The facing position of each moving member 74 does not have to be the position where the moving member 74 stands erect in the A-axis direction, and the facing position may be a position where the moving member 74 is in an inclined state extending in an intersecting direction intersecting with the X-axis direction. In the −A direction with respect to the mounting portion 46, the supporting member 92 does not have to be provided. A plurality of the supporting members 92 may be provided at an interval in the X-axis direction. Each supporting member 92 may be held at the second position without being stored in the supporting member storage portion 91. The second angle θB may be equal to or larger than the first angle θA.

The moving member 74 and the supporting member 92 may be disposed at positions where the entire moving member 74 and the entire supporting member 92 overlap with each other in the X-axis direction. Alternatively, the moving member 74 and the supporting member 92 may be disposed at positions where the moving member 74 and the supporting member 92 are shifted from each other in the X-axis direction. A configuration in which the second unit 4 and the third unit 5 are separated from each other, and the first discharge roller 28 is divided from the second discharge roller 29 may be adopted.

When viewed in the −B direction, the operation unit 42 may overlap with at least a part of the moving region A1 of the moving member 74 in the X-axis direction. In other words, when viewed in the X-axis direction, the operation unit 42 may be disposed and shifted from the moving region A1 in the B-axis direction. In addition, when viewed in the X-axis direction, the operation unit 42 may overlap with the entire moving region A1. Only a part of the buzzer 47 may be located between the touch panel 44 and the mounting portion 46.

What is claimed is:

1. An image reading apparatus comprising:
a reading unit that reads a document;
a reversing unit that reverses front and rear of the document read by the reading unit;
a discharge unit that discharges the document reversed in the reversing unit in a discharging direction;
a mounting portion on which the document discharged by the discharge unit is mounted; and
a pressing portion that presses the document toward the mounting portion, wherein
the pressing portion has
a moving member that is provided and configured to move toward the mounting portion, and
an elastic member that applies an elastic force to the moving member to cause the moving member to come into contact with the document on the mounting portion,
wherein a first interval between a downstream end in the discharging direction of the moving member and the mounting portion is smaller than a second interval between an upstream end in the discharging direction of the moving member and the mounting portion, and
wherein the moving member has a first surface facing a mounting surface of the mounting portion, and a second surface located upstream in the discharging direction with respect to the first surface, and when an angle formed by a virtual plane obtained by moving the mounting surface in parallel and the first surface is a first angle θ1, and an angle formed by the virtual plane and the second surface is a second angle θ2, the first angle θ1 is smaller than the second angle θ2.

2. The image reading apparatus according to claim 1, wherein
the moving member is disposed and overlaps with a center in a width direction intersecting with the discharging direction of the document, when viewed in a stacking direction of the document on the mounting portion.

3. The image reading apparatus according to claim 1, wherein the discharge unit includes
a rotation shaft that extends in a width direction intersecting with the discharging direction, and
a plurality of contact portions that is provided in the rotation shaft at an interval in the width direction and comes into contact with the document, and
the moving member is located between the plurality of contact portions in the width direction when viewed in the discharging direction.

4. The image reading apparatus according to claim 3, wherein
on an outer side of the contact portions in the width direction, a displacement member that displaces the document discharged from the discharge unit toward the mounting portion is provided.

5. The image reading apparatus according to claim 1, wherein
a cover portion that faces an upstream end portion in the discharging direction of the mounting portion is provided,
the cover portion has a storage portion that is configured to store the moving member, and
the moving member is provided and configured to be rotated to a storage position when being stored in the storage portion and to a facing position when being configured to come into contact with the document.

6. The image reading apparatus according to claim 1, wherein
an operation unit that is configured to operate a reading operation of the document by the reading unit is provided, and
the operation unit overlaps with at least a part of a moving region of the moving member when viewed in a width direction intersecting with the discharging direction.

7. The image reading apparatus according to claim 1, further comprising
an apparatus main body including the mounting portion, wherein
the apparatus main body is provided with a supporting member that is located downstream in the discharging direction of the mounting portion and configured to support the document.

8. The image reading apparatus according to claim 7, wherein
when viewed in a stacking direction of the document on the mounting portion, at least a part of the moving member and at least a part of the supporting member are aligned in the discharging direction.

9. The image reading apparatus according to claim 7, wherein
the apparatus main body has a supporting member storage portion that is configured to store the supporting member, and
the supporting member is provided and configured to be rotated to a first position when being stored in the supporting member storage portion and to a second position when being configured to support the document.

10. The image reading apparatus according to claim 7, wherein
the supporting member is not located on a side of the moving member with respect to a virtual line obtained by extending the mounting surface of the mounting portion to a side of the supporting member.

11. The image reading apparatus according to claim 7, wherein a second inclination angle θB formed by the supporting member and a horizontal direction is smaller than a first inclination angle θA formed by the moving member and the horizontal direction.

12. The image reading apparatus according to claim 1, wherein
the discharge unit has a first discharge roller that is configured to rotate, and a second discharge roller that discharges the document by rotating while pinching the document together with the first discharge roller,
the apparatus main body has a first main body portion that supports the first discharge roller, and a second main body portion that supports the second discharge roller, and
the second main body portion is provided and configured to move relatively to the first main body portion to cause the second discharge roller to be configured to come into contact with and be separated from the first discharge roller.

13. The image reading apparatus according to claim 1, wherein
an operation unit that is configured to operate a reading operation of the document by the reading unit is provided, and
the operation unit is located outside a moving region of the moving member when viewed in a stacking direction of the document on the mounting portion.

14. The image reading apparatus according to claim 13, wherein
the operation unit overlaps with at least a part of the moving region of the moving member when viewed in a width direction intersecting with the discharging direction.

15. The image reading apparatus according to claim 13, wherein
the operation unit has a touch panel and a notification unit that performs notification by outputting sound, and
at least a part of the notification unit is located between the touch panel and the mounting portion.

16. An image reading apparatus comprising:
a reading unit that reads a document;
a reversing unit that reverses front and rear of the document read by the reading unit;
a discharge unit that discharges the document reversed in the reversing unit in a discharging direction;
a mounting portion on which the document discharged by the discharge unit is mounted; and
a pressing portion that presses the document toward the mounting portion, wherein
the pressing portion has
a moving member that is provided and configured to move toward the mounting portion, and
an elastic member that applies an elastic force to the moving member to cause the moving member to come into contact with the document on the mounting portion,
wherein there is a gap between the pressing portion and the mounting portion.

\* \* \* \* \*